(12) United States Patent
Mori et al.

(10) Patent No.: US 9,406,089 B2
(45) Date of Patent: Aug. 2, 2016

(54) VIDEO-VOICE PREPARATION OF ELECTRONIC TAX RETURN

(71) Applicant: Intuit Inc., Mountain View, CA (US)

(72) Inventors: Kenichi Mori, Carlsbad, CA (US); Justin C. Marr, San Diego, CA (US); Catherine M. H. Harriss, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 85 days.

(21) Appl. No.: 13/874,382

(22) Filed: Apr. 30, 2013

(65) Prior Publication Data

US 2014/0324648 A1    Oct. 30, 2014

(51) Int. Cl.
*G06Q 40/00* (2012.01)

(52) U.S. Cl.
CPC .................... *G06Q 40/123* (2013.12)

(58) Field of Classification Search
None
See application file for complete search history.

(56) References Cited

U.S. PATENT DOCUMENTS

| | | | | |
|---|---|---|---|---|
| 4,816,911 A * | 3/1989 | Kirsch | ............ | H04N 1/00236 358/400 |
| 5,995,490 A * | 11/1999 | Shaffer | ............ | H04L 12/5695 348/14.08 |
| 6,141,659 A * | 10/2000 | Barker | ............ | G06F 17/30634 |
| 6,205,231 B1 * | 3/2001 | Isadore-Barreca | ...... | G06K 9/32 375/E7.081 |
| 6,473,741 B1 * | 10/2002 | Baker | ............ | G06Q 10/10 705/1.1 |
| 7,636,742 B1 * | 12/2009 | Olavarrieta | ....... | G06F 17/30395 |
| 7,716,099 B1 * | 5/2010 | Welch | ............ | G06F 17/30873 379/88.17 |
| 7,752,092 B1 * | 7/2010 | Mattice | ............ | G06F 17/2235 705/30 |
| 7,865,829 B1 * | 1/2011 | Goldfield | ............ | G06F 9/4446 715/708 |
| 7,930,226 B1 * | 4/2011 | Quinn | ............ | G06Q 10/10 705/31 |
| 7,930,642 B1 * | 4/2011 | Gerde | ............ | H04N 1/40 382/312 |
| 8,024,269 B1 * | 9/2011 | Ballard | ............ | G06Q 10/10 705/35 |
| 8,150,747 B2 * | 4/2012 | Neher, III | ............ | G06Q 40/02 705/31 |
| 8,156,018 B1 * | 4/2012 | Quinn | ............ | G06F 17/2264 705/19 |
| 8,191,152 B1 * | 5/2012 | Barker | ............ | G06Q 40/00 704/244 |
| 8,584,029 B1 * | 11/2013 | Gerde | ............ | G06F 3/0488 715/771 |
| 8,656,273 B1 * | 2/2014 | Tifford | ............ | G06Q 10/10 705/3 |
| 8,682,756 B1 * | 3/2014 | Tifford | ............ | G06F 17/243 705/31 |

(Continued)

OTHER PUBLICATIONS

PCT International Search Report dated Feb. 26, 2014 in International Application No. PCT/US2013/039936 filed May 7, 2013, Form ISA 220 and 210, (5 pages).

(Continued)

*Primary Examiner* — Ryan D Donlon
*Assistant Examiner* — Garrison Prinslow
(74) *Attorney, Agent, or Firm* — Vista IP Law Group LLP; Gary D. Lueck

(57) ABSTRACT

Methods, systems and computer program products for processing video of tax documents and associated verbal input provided by a user and populating at least a portion of an electronic tax return with processing results. A video/voice processor associated with a tax return preparation application executed by a computing apparatus such as mobile communication device receives a video of a tax document and voice data. The document type is determined using video and/or voice data. Voice to text conversion can be used to determine what a user said about the document to determine the document type. Tax data determined from the video is used to populate a field of the electronic tax return. A front facing camera may be used to take a video of a tax document while a rear facing camera is used to detect a facial expression, which may result in certain dialogue with the user.

43 Claims, 27 Drawing Sheets

(56) References Cited

U.S. PATENT DOCUMENTS

| | | | | |
|---|---|---|---|---|
| 8,732,845 B1* | 5/2014 | Barker | G06Q 40/00 704/244 |
| 2002/0013701 A1* | 1/2002 | Oliver | G06F 3/16 704/231 |
| 2002/0013747 A1* | 1/2002 | Valentine | G06Q 20/10 705/31 |
| 2004/0181749 A1* | 9/2004 | Chellapilla | G06F 17/243 715/222 |
| 2005/0205660 A1* | 9/2005 | Munte | G06Q 20/00 235/379 |
| 2006/0112114 A1* | 5/2006 | Yu | G06Q 10/10 |
| 2007/0016607 A1* | 1/2007 | Yu | G06Q 40/10 |
| 2007/0022372 A1* | 1/2007 | Liu | G06F 17/30029 715/201 |
| 2007/0094205 A1* | 4/2007 | Yu | G06Q 10/10 706/47 |
| 2007/0094206 A1* | 4/2007 | Yu | G06Q 10/10 706/47 |
| 2007/0094207 A1* | 4/2007 | Yu | G06Q 10/10 706/47 |
| 2007/0299949 A1* | 12/2007 | Macbeth | G06F 17/2785 709/223 |
| 2008/0092181 A1* | 4/2008 | Britt | H04N 7/1675 725/87 |
| 2008/0109355 A1* | 5/2008 | Dutta | G06Q 20/04 705/43 |
| 2009/0248594 A1* | 10/2009 | Castleman | G06F 9/4446 706/11 |
| 2009/0300068 A1* | 12/2009 | Tang | G06F 17/30011 |
| 2010/0070394 A1 | 3/2010 | Wyle | |
| 2010/0142927 A1* | 6/2010 | Lim | H04N 21/2368 386/239 |
| 2011/0263946 A1* | 10/2011 | el Kaliouby | A61B 5/1128 600/300 |
| 2012/0022983 A1* | 1/2012 | Hughes, Jr. | G06Q 40/02 705/31 |
| 2012/0027246 A1* | 2/2012 | Tifford | G06K 9/033 382/100 |
| 2012/0084185 A1* | 4/2012 | Ciaramitaro | G06Q 40/123 705/31 |
| 2012/0109792 A1* | 5/2012 | Eftekhari | G06F 21/31 705/31 |
| 2012/0211561 A1* | 8/2012 | Lieberman | G06Q 40/123 235/383 |
| 2012/0215669 A1* | 8/2012 | Lieberman | G06Q 40/123 705/31 |
| 2012/0219175 A1* | 8/2012 | Richardson | G06Q 40/00 382/103 |
| 2013/0033522 A1* | 2/2013 | Calman | G06Q 30/0633 345/633 |
| 2013/0036347 A1* | 2/2013 | Eftekhari | G06Q 40/00 715/222 |
| 2014/0027509 A1* | 1/2014 | Lieberman | G06Q 40/123 235/383 |
| 2014/0108557 A1* | 4/2014 | Calman | G06Q 10/101 709/205 |
| 2014/0253804 A1* | 9/2014 | Asukai | H04N 5/265 348/584 |

OTHER PUBLICATIONS

PCT Written Opinion dated Feb. 26, 2014 in International Application No. PCT/US2013/039936 filed May 7, 2013, Form ISA 237, (3 pages).

* cited by examiner

| Segment 1501 | Meaning / Context / Interpretation 1502 | Tax Document 1503 |
|---|---|---|
| Segment 1 | Meaning 1 | Tax Document 1 |
| Segment 2 | Meaning 2 | |
| Segment 3 | Meaning 3 | |
| Segment 4 | Meaning 4 | Tax Document 4 |
| Segment n | Meaning 5 | |

Voice Segment Database / Table 1500

FIG. 15

VIDEO-VOICE PREPARATION OF ELECTRONIC TAX RETURN

SUMMARY

Embodiments are related to preparation of an electronic tax return based on video/audio data of tax documents.

Certain embodiments are directed to processing a video taken of one or more tax documents and populating at least a portion of an electronic tax return with results of video processing.

Certain embodiments are directed to acquiring or receiving and processing video or photograph of a tax document and audio data in the form voice or speech by a user of a tax preparation application for the purpose of populating one or more fields of an electronic tax return or interview screen generated by the tax preparation application will be populated. Voice or speech data may be part of the video or recorded and received separately of the video or photograph of a tax document. At least a portion of an electronic tax return is populated with results of video/voice processing, which may involve analysis of document structure within the video or photograph and character recognition. For example, a video may be analyzed to determine the type or name of the tax document, and voice data may be analyzed to determine or confirm the type or name of the tax document by providing additional contextual information about the tax documents such as a description of the tax document, the source of the tax document, or other verbal explanation regarding the document's relevance to the electronic tax return. A character recognition process may be applied to video frames, images or photographs to determine tax data therein, and that recognized tax data may be used to populate one or more fields of an electronic tax return for that tax document.

Certain embodiments are directed to use of multiple video or image capture devices for preparation of an electronic tax return including video and/or voice processing for determining document types and tax data for electronic tax returns, and for detecting user expressions or gestures during electronic dialogue with a computing apparatus or tax preparation application. The electronic dialogue may occur during recording or imaging of the documents and/or during preparation of an electronic tax return or during which video and/or voice processing is performed. For example, a first or front-facing camera of a computing apparatus may be used to acquire a video or photograph of a tax document, and a second or rear-facing camera facing the user may be used to detect a facial expression or gesture of the user during the process or electronic dialogue generated according to embodiments. With embodiments, the tax preparation application generates and presents responses related to the detected expression or gesture. The first and second cameras and associated processing may be operated or performed simultaneously or by the same processor, or independently of each other or at different times. For example, the rear-facing camera may be used to detect user frustration or apprehension such as by an inquisitive look or frown, and embodiments may determine appropriate responses to alleviate user concerns such as providing affirmation to the user that the process is proceeding as it should, or by providing positive news about a refund the user will receive.

Certain embodiments are directed to monitoring biometric data during tax document processing and/or preparation of an electronic tax return. One embodiment involves detection of pulse rate or change thereof, which may indicate user reaction or emotion during various stages of preparing an electronic tax return including recording of video of documents and/or voice descriptions thereof, electronic dialogue and preparation of the electronic tax return. For example, a sudden increase in pulse rate may indicate user frustration or apprehension, and embodiments may determine appropriate responses to alleviate user concerns or provide positive news about the user's refund, which may be detected or confirmed by a detected reduction in pulse rate or return to a prior pulse rate.

Certain embodiments are directed to receiving user-provided voice descriptions of tax documents such as a description of the type of document, data within the document, source of the document, or other description of or explanation why the document is relevant to the electronic tax return. User-provided voice descriptions can be utilized in conjunction with video or photograph processing to identify or confirm identification of a tax document and can be used as part of the electronic dialogue about tax documents being processed or to be processed.

Certain embodiments are directed to processing of a single video of one tax document or processing of a single video of multiple tax documents (e.g., a continuous video taken of different tax documents, and the user moving the video acquisition or computing device to scan different tax documents, or placing different tax documents in front of the video acquisition or computing device). Thus, embodiments may be utilized to partially prepare an electronic tax return based on video and/or voice processing, with the remaining sections being manually completed by the user as necessary, or an electronic tax return can be completed based exclusively on processing of video or video and voice data without requiring the user to manually enter data, thus greatly simplifying and expediting preparation of electronic tax returns.

Certain embodiments are directed to utilizing multiple and opposite facing video or image capture elements such as front and rear facing cameras of a mobile communication device such as a smartphone or tablet computing device. With embodiments, the user can acquire video or photographs of one or more tax documents with one video or image capture element while the opposite facing video or image capture element is used to detect facial expression or gesture of the user. The user may also speak to provide voice data that is recorded and processed according to embodiments. Thus, different video or image capture elements can be used for different purposes, one of which does not involve imaging or video of a tax document. Such embodiments may be executed, for example, during electronic dialogue generated according to embodiments such that system generated or selected responses related to facial expressions or gestures indicative of reaction or emotion can be presented to the user. For example, the rear-facing camera may be used to detect that user frustration or apprehension as indicated by a facial expression of an inquisitive look or frown, or change from a smile to a frown, and appropriate responses can be generated or selected and presented by the tax preparation application to the user to alleviate the detected concerns of the user.

Certain embodiments are directed to generating and presenting an electronic dialogue that is presented to the user while the user is taking a video of tax documents and/or verbally describing tax documents. The electronic dialogue may be in the form of follow up questions or instructions given a determined tax document type and/or voice input spoken by the user. For example, if a tax document involves data indicating the user is married, embodiments may determine, with reference to a tree structure, table or other data structure, follow up questions to be audibly presented to the user. With the example of the user being married, follow-up questions may include, for example, questions about children of the user and deductions related to home ownership. Thus, the user may take a video of tax documents, while verbally describing those documents, and respond verbally or via the computing apparatus or mobile communication device to questions or instructions of the generated electronic dialogue presented by the tax preparation application. The questions or instructions selected for the electronic dialogue may also be pre-determined and based on the user's response or input, facial expression or reaction and/or biometric data.

Certain other embodiments are directed to allowing a user to provide a voice description of tax documents such as a description of the type of document, data within the document, source of the document, or other description of why the document is relevant to the electronic tax return. These voice descriptions can be utilized in conjunction with video and photograph processing to identify or confirm identification of a tax document.

Certain other embodiments are directed to various combinations of embodiments discussed above. For example, certain embodiments may involve one or more or all of tax document type determination, tax document character recognition and population of fields of an electronic tax return. As a further example, certain embodiments may involve one or more or all of processing a video of a tax document, processing voice data of a user, which may be part of a video file or clip or processed independently of a video file or clip, detection of facial expressions or gestures, and detection of biometric data and electronic dialogue.

A further embodiment is directed to a computer-implemented method for populating an electronic tax return and comprises receiving an image of a tax document and receiving voice data of a user of a tax preparation application executed to prepare the electronic tax return. The method further comprises analyzing the image and the voice data to determine a document type and tax data contained within the image, identifying a field of the electronic tax return to be populated with determined tax data of the determined document type, and populating the field with the determined tax data. For example, one embodiment is directed to a computer-implemented method for populating an electronic tax return and comprises a computing apparatus acquiring and/or receiving a video of a tax document. The video includes a plurality of frames and voice data of a user preparing the electronic tax return, or the voice data may be separate from the video frames. The method further comprises analyzing at least one frame and the voice data to determine the type of tax document captured in the recorded video and tax data contained therein. The method further comprises identifying a field of the electronic tax return to be populated with determined tax data of the determined document type and populating the field with the determined tax data.

Yet other embodiments are directed to systems configured to perform video/audio processing of tax documents and populating an electronic tax return. For example, a computing apparatus or processor thereof, e.g., in the form of a computer, mobile communication device, or tablet computing device may be configured to execute embodiments, which may be a module or component of a tax preparation application. Systems may include only the computing apparatus, or the computing apparatus and one or more databases or tables that are used, for example, for the purpose of comparing a detected structure of a tax document in a photograph or video frame and pre-determined tax document templates, or to compare voice data segments and pre-determined voice segments or words for the purpose of determining the meaning or context of a verbal description of the tax document provided by the user. System embodiments may also include a camera or other video or image capture element if such elements are not part of or integrated within the computing apparatus.

Further embodiments are directed to articles of manufacture or computer program products comprising a non-transitory, computer readable storage medium having instructions which, when executed by a computer or computing apparatus, cause one or more processors of the computer or computing apparatus to execute a process for processing video and/or audio data of a tax document and populating an electronic tax return according to embodiments.

In a single or multiple embodiments, the computing apparatus receives a previously recorded video. In other embodiments, the computing apparatus is involved in recording or acquiring the video. For example, a video may be previously recorded and stored on and received from a memory card (such as a memory card for a camera or camcorder). The video can also be acquired and processed by the same component such as a mobile communication or tablet device having one or more cameras for video acquisition. The video of one or more tax documents and voice data may be simultaneously recorded, received and stored by the computing apparatus. The video and voice data may also be acquired or recorded separately and subsequently synchronized or associated with each other as needed based on, for example, timestamp and elapsed time data.

In a single or multiple embodiments, individual video frames or static images of a video are analyzed to determine the type of tax document that was captured in a frame or image. The document type can be determined by determining a structure of the tax document that was captured (e.g., structure of boxes, lines, symbols, dimensions, spacing, or other structural attributes) and comparing that determined structure to respective structures of pre-determined tax document templates. A template having a structure matching or that most closely matches the determined structure can be selected, and the tax document type is determined based on the type of tax document represented by the selected template. If the document type cannot be determined, according to one embodiment, the user-provided voice data is analyzed to determine additional document related or contextual information about the imaged document. Voice data analysis may involve converting voice into text, parsing the text data into segments such as individual words, comparing segments and pre-determined segments (such as selected keywords indicative of particular document types), and determining or confirming the document type based at least in part upon the comparison. If the document type still cannot be determined, frames for that document can be tagged, and the user can be requested to provide input to identify the document type. The determined structure of this document can then be stored as a template for future comparisons.

In a single or multiple embodiments, a video frame is selected (e.g., the first frame, or the middle frame of a plurality of frames, or a frame having the best optical attribute such as contrast), and that frame or image is analyzed to determine the document type and the tax data, e.g., using template comparisons and a character recognition process or program. Thus, document type and tax data determinations involve different recognition processes or video or frame analyses.

In a single or multiple embodiments, voice or speech data provided or spoken by the user can be associated or synchronized with video data or frames thereof such that the determined meaning or context of voice data is matched to respective videos or frames thereof. Such association or synchronization may be based on one or more of video and voice data start times or timestamps and elapsed times. Synchronization may also be based on pre-determined voice segments. For example, the user may be taking a video of a first tax document and provides a first verbal description, then switches to taking a video of a second tax document and provides a second verbal description. Synchronization can be based on a pre-determined term spoken by the user such as "next" or "next document" to signal the beginning of a video and/or voice description of the next or new tax document, or by the user clicking a user interface element such as "done" to signify that the user 215 is finished with a tax document 106 and that any following verbal description is for the next tax document to be recorded.

In a single or multiple embodiments, processing is performed by a computing apparatus of a mobile communication device such as a smartphone or tablet computing device or other computing apparatus, which executes or accesses a tax preparation application to acquire the video of one or more tax documents using a camera or other video or image capture element. In one embodiment, the video is acquired and received by the computing apparatus as a result of the user positioning the tax document and the mobile communication device such that the tax document is in view of the camera. The video can be acquired while the user speaks, and this voice data is detected by a microphone of the mobile communication device. Other camera or video or image acquisition devices may also be utilized such as a web camera or a camcorder.

In a single or multiple embodiments, the computing apparatus engages in an interactive electronic dialogue with the user. Dialogue communications may be in response to at least one of the determined document type and determined tax data. For example, when a document type determination is made, the computing apparatus may determine appropriate responses in the form related questions, instructions or explanations. These questions, instructions or explanations may be identified by the computing apparatus referring to a tree structure, database or table identifying the responses to be presented in response to different detected document types or verbal input by the user. The responses can be presented audibly and/or via a display or user interface. For these purposes, the computing apparatus may utilize text-to-speech processing to present the questions, instructions or explanations to the user, and voice recognition to interpret the user's answers.

In a single or multiple embodiments, the computing apparatus determines which response to present to the user based at least in part upon a detected facial expression or gesture of the user. The facial expression or gesture can be determined by analysis of a video or frame thereof. This detection may occur during, for example, the electronic dialogue with the user. Corresponding responses to the detected facial expression or gesture can then be determined, e.g., by reference to a tree structure, database or table, and presented to the user. In certain embodiments, a first video or image capture element of the computing apparatus is used to take a video of a tax document, and facial expression or gesture is performed using a different second video or image capture element of the computing apparatus, e.g., using front and rear facing cameras. In one embodiment, tax document recording and facial or gesture recognition are performed simultaneously using different, opposite facing cameras.

In a single or multiple embodiments, the computing apparatus determines which response to present to the user based at least in part upon a detected biometric data. In one embodiment, the biometric data is the user's pulse. Other biometric data may include the user's temperature, skin color (e.g., whether the user is pale or red) or change thereof, and whether the user is perspiring. These types of biometric data are indicative of a certain feelings or reactions to embodiment processing, electronic dialogue or certain questions or explanations presented to the user.

In one embodiment, the biometric data such as the pulse or temperature of the user of a mobile communication device is detected while the user is holding the mobile communication device. In other embodiments, the user may have or be wearing a biometric sensor, or such sensors may be integrated within the user's clothing, and communications between the worn sensor and a mobile communication device may be by wireless communications such as BLUETOOTH communications. Embodiments may involve detection of one or multiple types of biometric data, and in the case in which multiple types of biometric data are acquired, analysis and processing may be based on, for example, a weighted average or other statistical methodology or priority to a certain type of biometric data if a detected reading surpasses a pre-determined threshold.

DESCRIPTION OF THE DRAWINGS

The foregoing and other aspects of embodiments are described in further detail with reference to the accompanying drawings, wherein:

FIG. 15 illustrates a table or database including data of voice data text segments and information about how the text segments relate to tax documents;

DETAILED DESCRIPTION OF ILLUSTRATED EMBODIMENTS

Embodiments are related preparing at least a portion of an electronic tax return based at least in part upon processing a video taken of tax documents, or by processing video and voice data describing the tax document or how the tax document is relevant to the electronic tax return.

Figure 1:
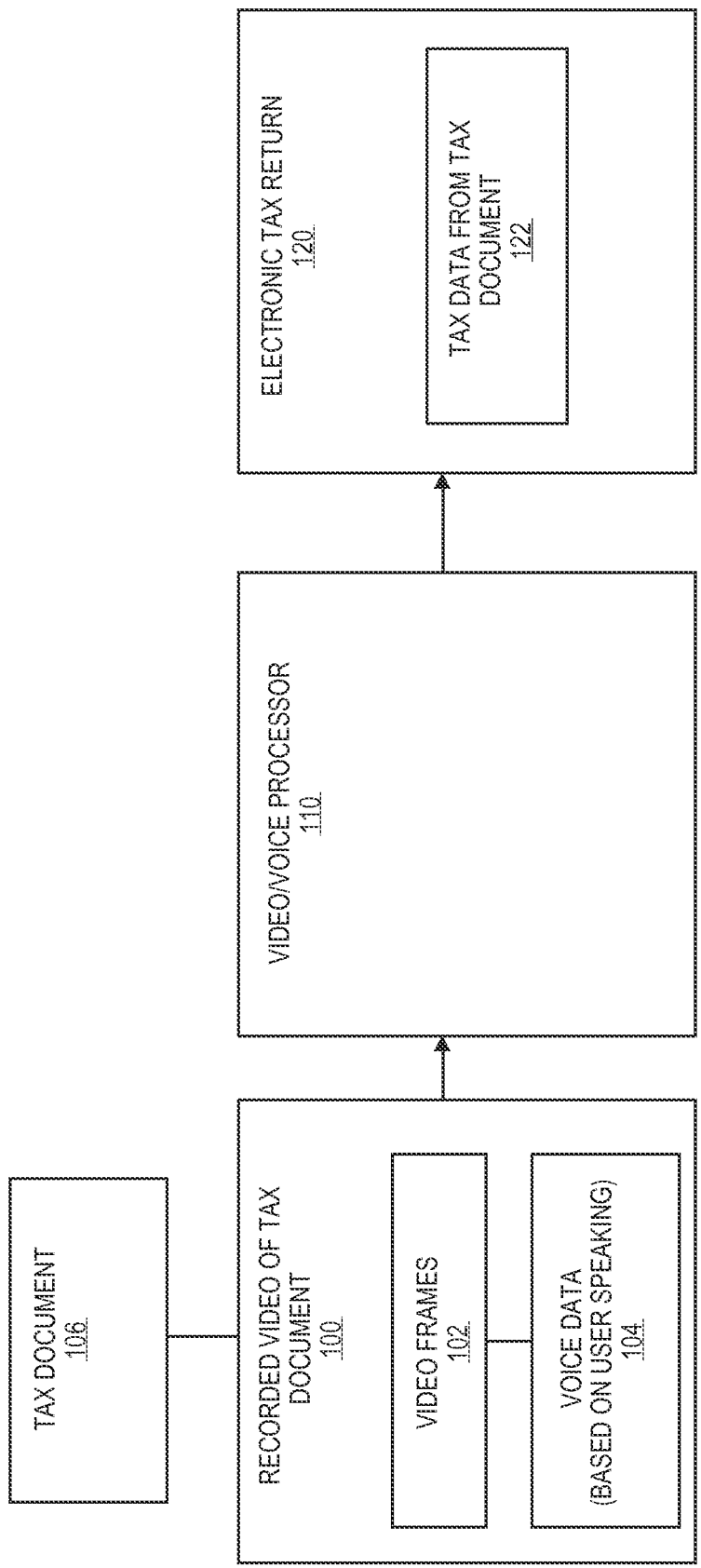
FIG. 1 is a block diagram generally illustrating video/voice processing for preparation of an electronic tax return according to embodiments.

As generally illustrated in FIG. 1, according to one embodiment, a video 100 is taken of a tax document 106. The video 100 includes frames 102 and associated audio data 104 in the form of speech or voice data 104 spoken by a user, e.g., spoken by the user while the user records the video 100 of the tax document 106. The video 100 is provided to a computing apparatus or processor 110, which analyses video frames 102 and voice data 104. Results of the video/voice analyses may be applied to populate fields or sections of an electronic tax return 120 or interview screens of a tax preparation application utilized to prepare the electronic tax return 120 with determined tax data contained within the tax document 106.

Thus, embodiments allow users to record and provide data about tax documents 106 in a manner that is natural to the user, while also being more flexible and convenient compared to traditional tax preparation programs that are based on non-verbal, display-based question and answer interaction. Not only do embodiments provide for a more natural and flexible tax return preparation experience, but embodiments are particularly suited for use with smaller devices such as mobile communication and computing devices such as smartphones and tablets. Such mobile devices often have smaller display screens or display screens such that display-based question and answer interaction may be challenging or inconvenient. Embodiments are also able to solve this unmet need by leveraging video and audio capture components of the mobile communication or computing device and allowing the user to use the mobile device to take videos of tax documents while describing how the tax documents are relevant to the electronic tax return. A user may begin preparation and even complete preparation of an electronic tax return utilizing video, or video and voice data acquired via a mobile communication device and processing according to embodiments, without typing tax data into fields of the electronic tax return or interview screen generated by the tax preparation program. In the event that certain sections of the electronic tax return are not amenable to video or voice processing and tax return population, or if the tax document is not recognized, users can manually enter tax return data using the mobile or other device as desired. Further aspects of embodiments are described with reference to FIGS. 2-24.

Figure 2:
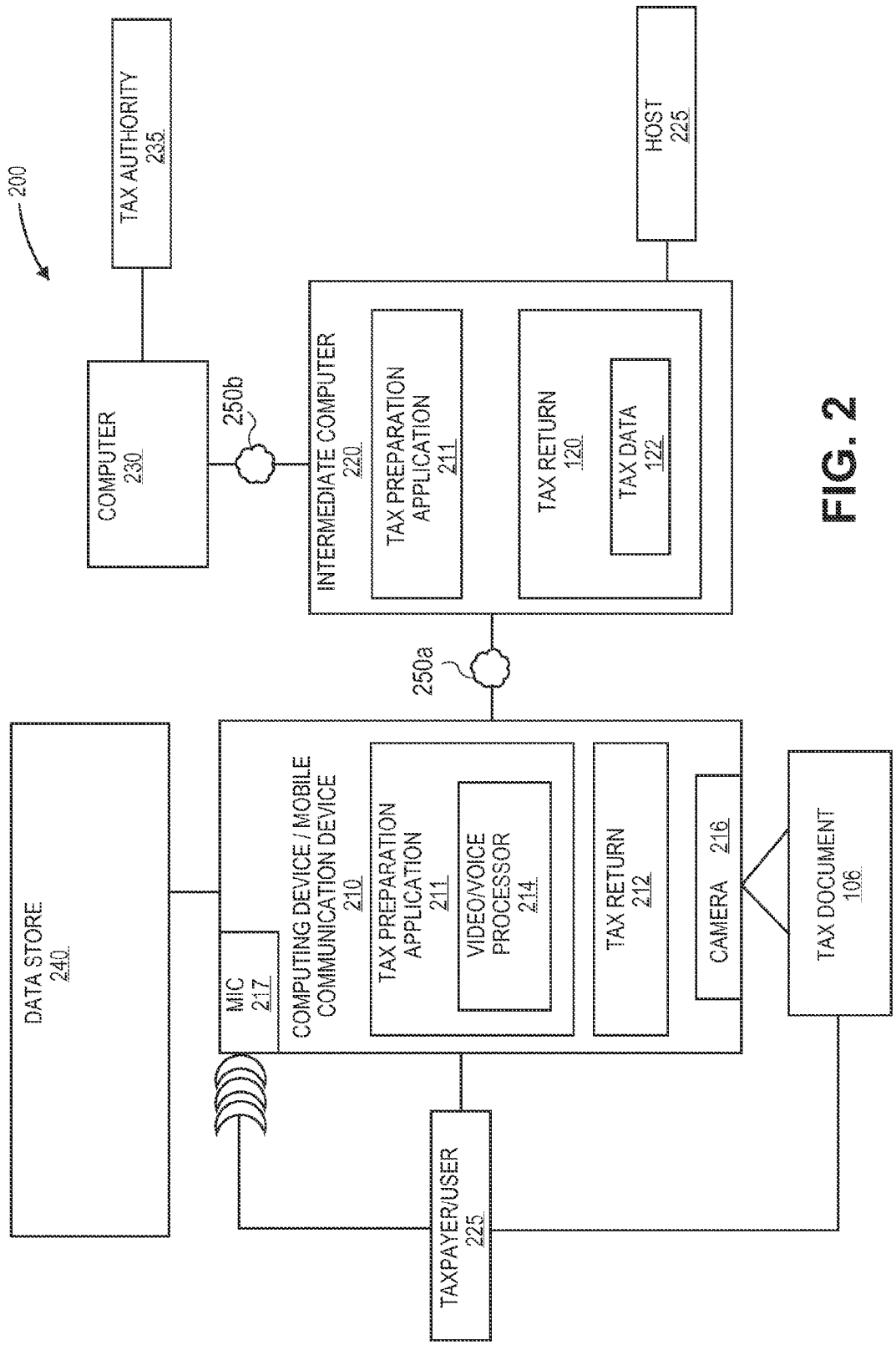
FIG. 2 is a block diagram of system components utilized in embodiments for processing video and voice data to prepare an electronic tax return.

FIG. 2 illustrates an embodiment of a system 200 or components thereof that are utilized or involved in execution of method embodiments. In the illustrated embodiment, the system 200 includes or involves a computer, computing apparatus, computing device or mobile communication or computing device 210 (generally, mobile communication device, computing device or computing apparatus 210) of a user 215. The user 215 may be a taxpayer, preparer or accountant. For ease of explanation, reference is made to user 215. Mobile communication device is defined to include mobile communication and computing devices capable of communications such as smartphones, a laptop computer, a Personal Digital Assistant (PDA) and a tablet device. For ease of explanation, reference is made generally to mobile communication device 210 or computing apparatus 210.

The system 200 also comprises or involves one or more intermediate computers 220 (one intermediate computer 220 is illustrated for ease of explanation) of one or more hosts 215, a computer 230 of a tax authority 235, and a data store or database 240 (generally, data store 240) accessible by the mobile communication device 210 locally or via a network connection (not shown in FIG. 2).

The intermediate computer 220 or another intermediate computer can serve as an electronic filing server or clearing house, formats and electronically files the completed electronic tax return 120 with the tax authority computer 230. The tax authority 235 with which tax returns 120 are filed may be a federal tax authority such as the Internal Revenue Service (IRS), a state tax authority such as the State Franchise Board of California or other tax collecting entity to which taxes are paid. For ease of explanation, reference is made generally to a tax authority 235, and examples involve the IRS, but it will be understood that tax authority 235 refers to various tax collecting entities, including local, state and federal tax collecting entities, and embodiments may apply to generate estimates of when a taxpayer can expect to receive refunds from one or more or all of local, state and federal tax authorities. The intermediate computer 220 or processes acknowledgements and other data received from the tax authority 235 and routes related information back to the computing apparatus 210. One example of an intermediate computer 220 or electronic filing server that may be utilized for these purposes is an electronic filing server of Intuit Inc., Mountain View, Calif.

In the illustrated embodiment, a video/voice processor 214 is utilized to analyze video and/or voice data according to embodiments and may be part of or in communication with the tax preparation application 211, one example of which is TURBO TAX tax preparation application, available from Intuit Inc., Mountain View, Calif. TURBO TAX is a registered trademark of Intuit Inc. The tax preparation application 211 may be utilized by taxpayers for the purpose of preparing a tax or information return or other tax filing, and that may be operable to record, transmit, transfer and organize data related to such tax filings, thus enabling taxpayers to file income tax returns or assisting them with managing their finances or tax-related matters. In embodiments involving a mobile communication device 210, the tax preparation application 211 may be in the form of a mobile application executing on the mobile communication device 210 or hosted by the intermediate computer 220 and accessible by the mobile communication device 210 executing a browser. It will be understood that the tax preparation application 211 and video/voice processor 214 (generally, processor 214) may execute locally on the mobile communication device 210 or accessed via a network connection.

While reference is made to a video/voice processor 214 ("processor" 214 generally), as shown in FIG. 2, the processor 214 may be used processing of different types of data according to embodiments. As described in further detail below, the processor 214 may be used for video frame processing, voice processing, video-voice synchronization, document structure recognition, character recognition, electronic dialogue, text to speech conversion, speech recognition, facial expression detection and biometric data detection, and for these purposes, may access respective programs and data hosted by the data store 240 as necessary. For ease of explanation, reference is made to a processor 214 or to a processor associated with a particular processing function such as voice processor that executes various aspects of embodiments.

As illustrated in FIG. 2, the mobile communication device is in communication through a network 250a with the intermediate computer 220, which may also be an electronic filing server operable to electronically file tax returns with the tax authority computer 230 and is in communication through a network 250b with the tax authority computer 230. Each of the networks 250a-b and other networks discussed herein (generally network 250) may be different, or two or more networks 250 may be the same depending on the system configuration and communication protocols employed. One or more or all of the networks 250 may be, for example, a cellular network, a wireless network, a Local Area Network (LAN) and/or a Wide Area Network (WAN) or a combination of two or more networks. Reference to a network 250 generally is not intended to refer to a specific network or communications protocol, and it should be understood that embodiments can be implemented using various networks and combinations thereof.

As shown in FIG. 2, the mobile communication device 210 also includes one or more cameras 216 or image or video capture elements (generally camera 216), operable to take videos and photographs of tax documents 106. The mobile communication device 210 also includes a microphone 217 ("Mic" in FIG. 2) that allows the user 215 to verbally describe information about the tax document 106 that is being recorded. The resulting video 100 may include both video frames 102 and voice data 104, or the voice data 104 may be acquired independently of the video 100 depending on how the computing device 210 is configured. Having generally described systems components, aspects thereof and their functionality and interoperability, various embodiments and aspects thereof are described in further detail with reference to FIGS. 3-24.

Figure 3:
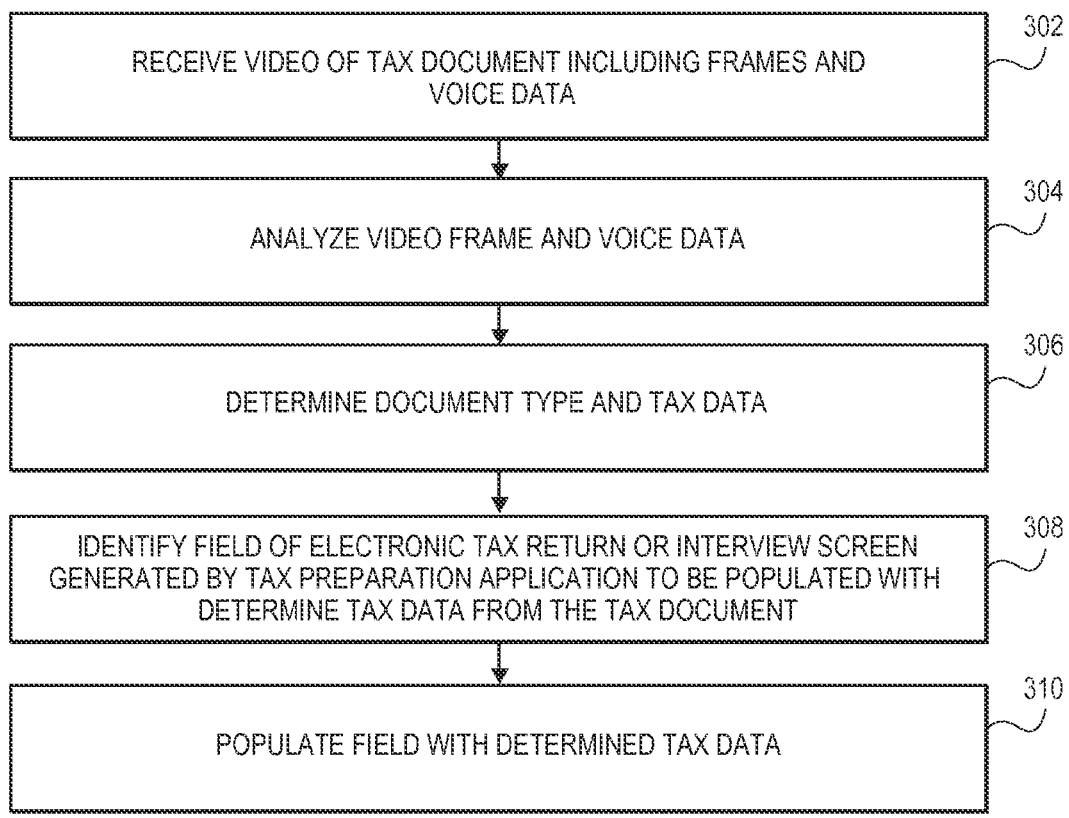
FIG. 3 illustrates an embodiment of a method for populating an electronic tax return based at least in part upon results of analyzing video frames and voice data.
Figure 4:
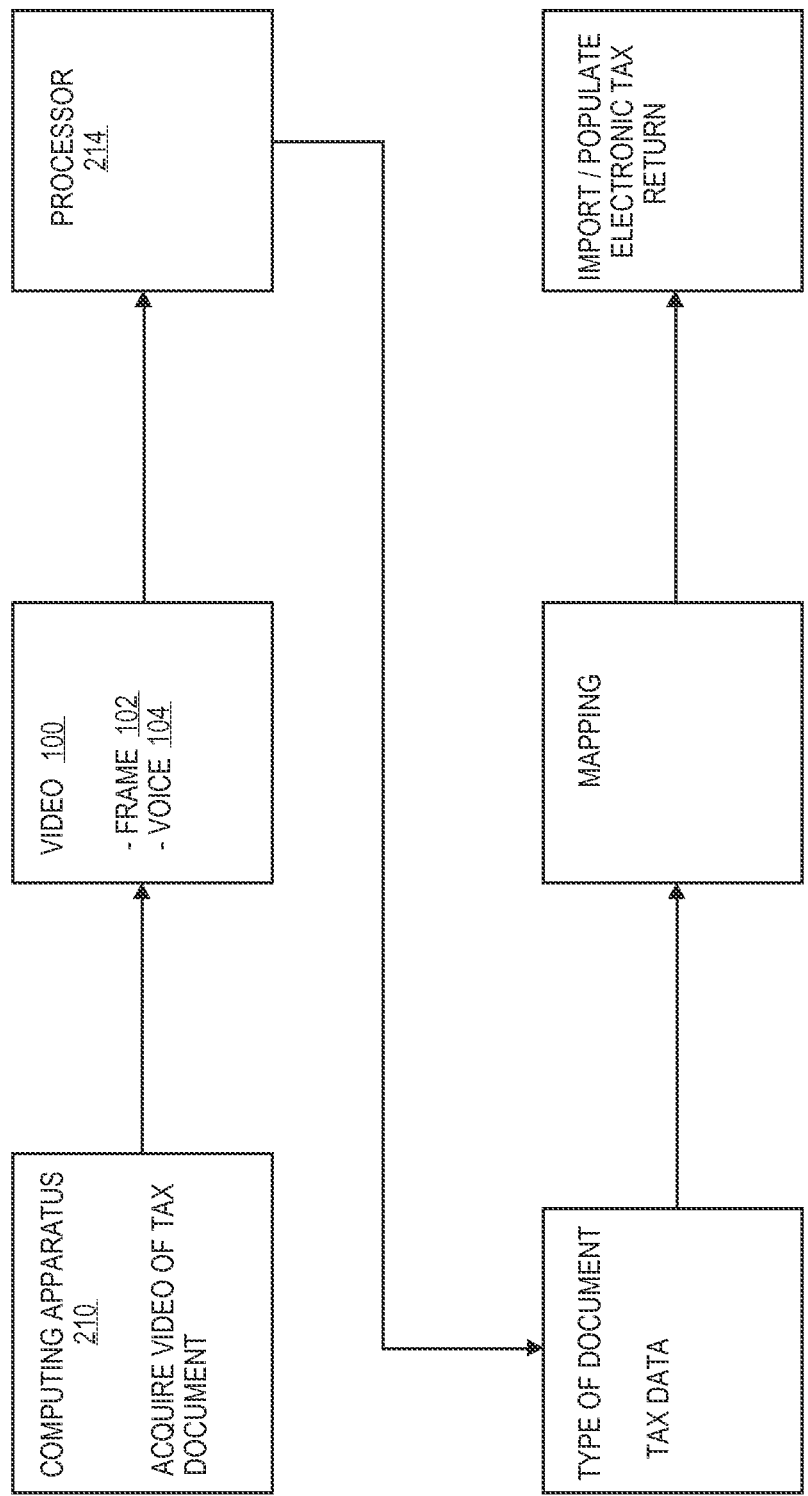
FIG. 4 is a system flow diagram showing receiving or acquisition of video and voice data, processing or analysis of video and voice data; mapping to an electronic tax return, and population of an electronic tax return according to embodiments.

Referring to FIG. 3, and with further reference to FIG. 4, in a method according to one embodiment, at 302, a video, video clip or file (generally, video 100) of one or more tax documents 106 is received by the processor 214. In the illustrated embodiment, the video 100 includes a plurality of frames 102 and voice data 104 of the user 215.

Figure 5:
FIG. 5 illustrates an example of a tax document that can be processed according to embodiments, and how a tax document may be structured.
Figure 6A:
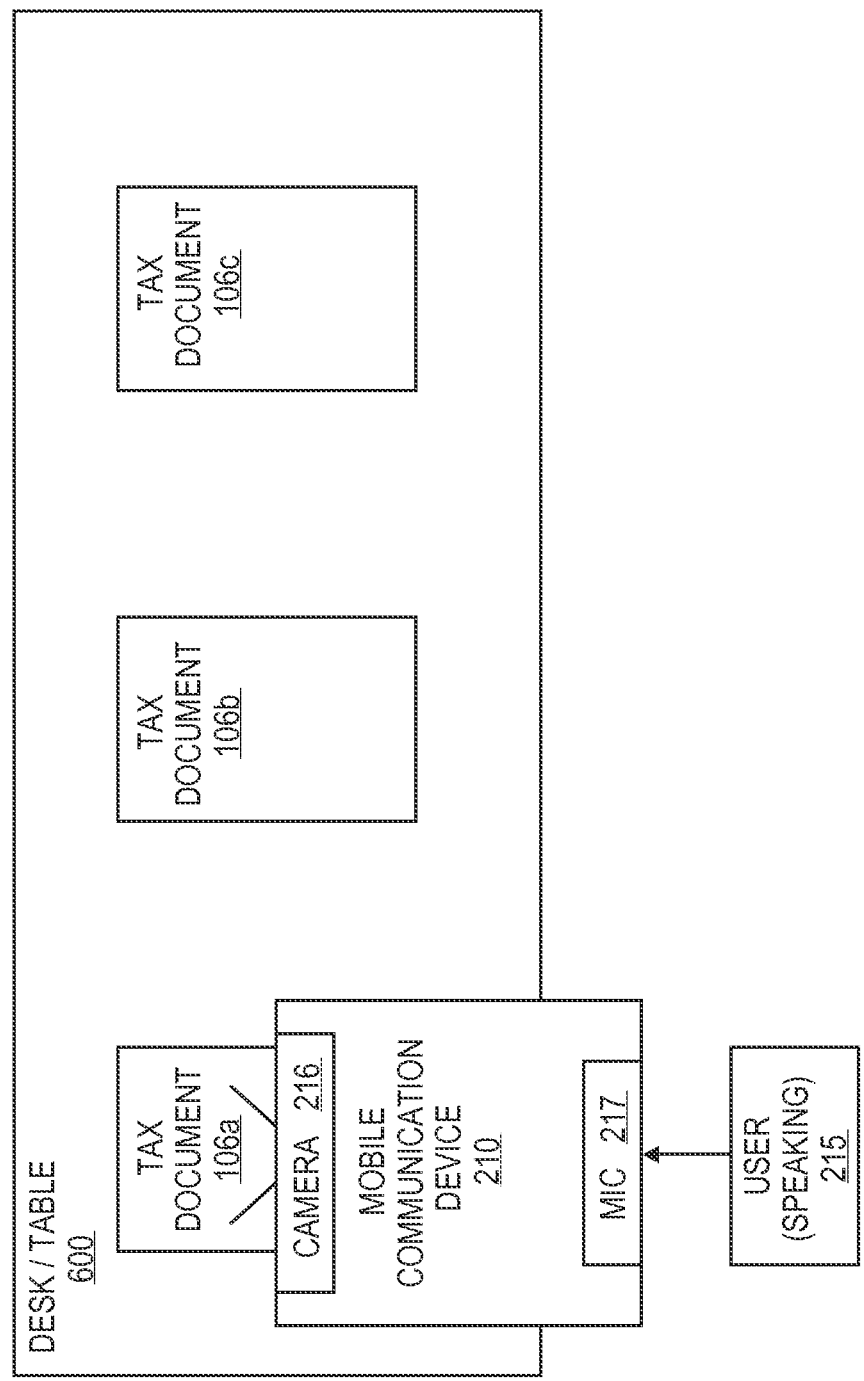
FIGS. 6A-C illustrate how a mobile communication device can be used to record video and user descriptions of multiple tax documents according to embodiments.
Figure 6B:
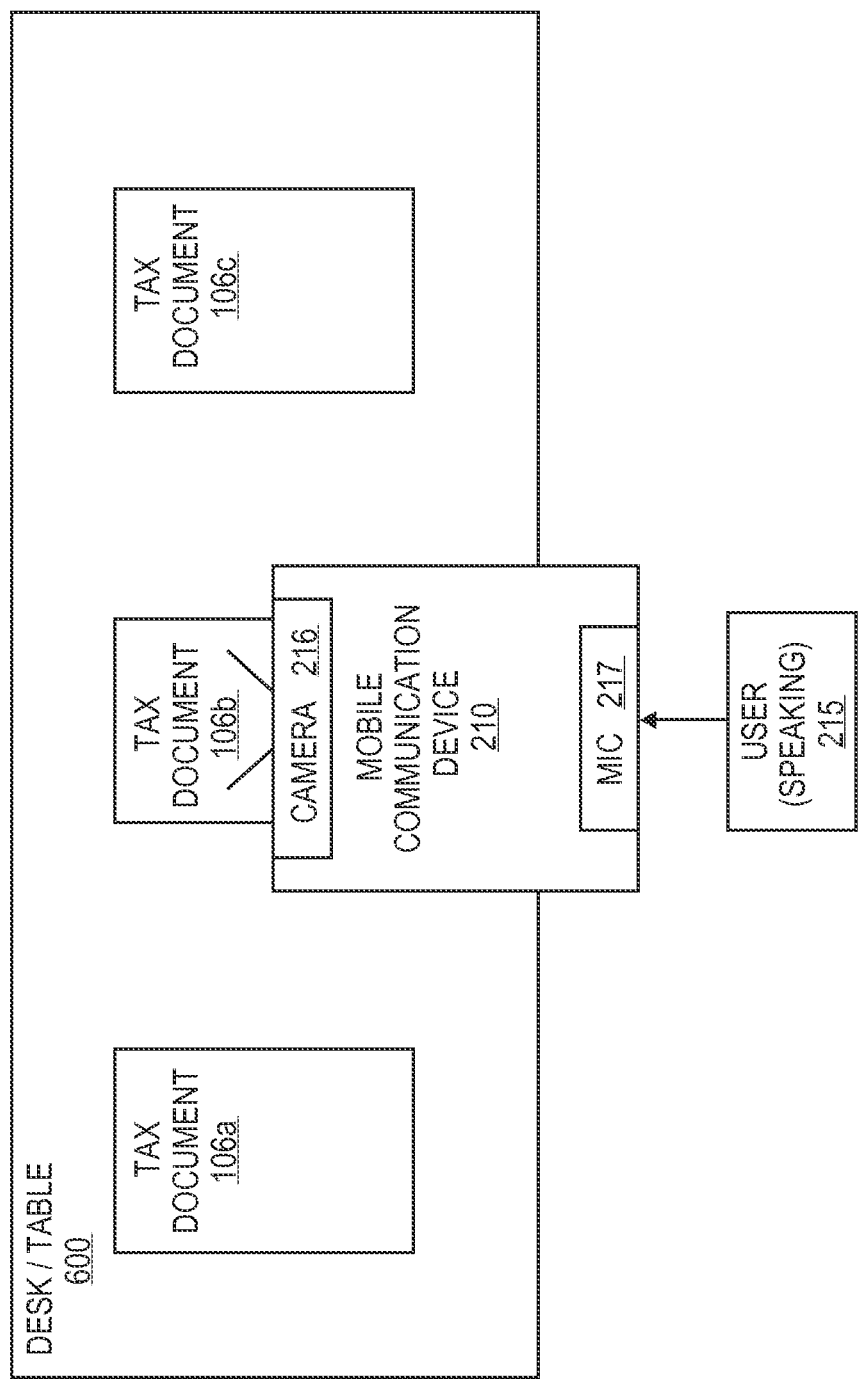
Figure 6C:
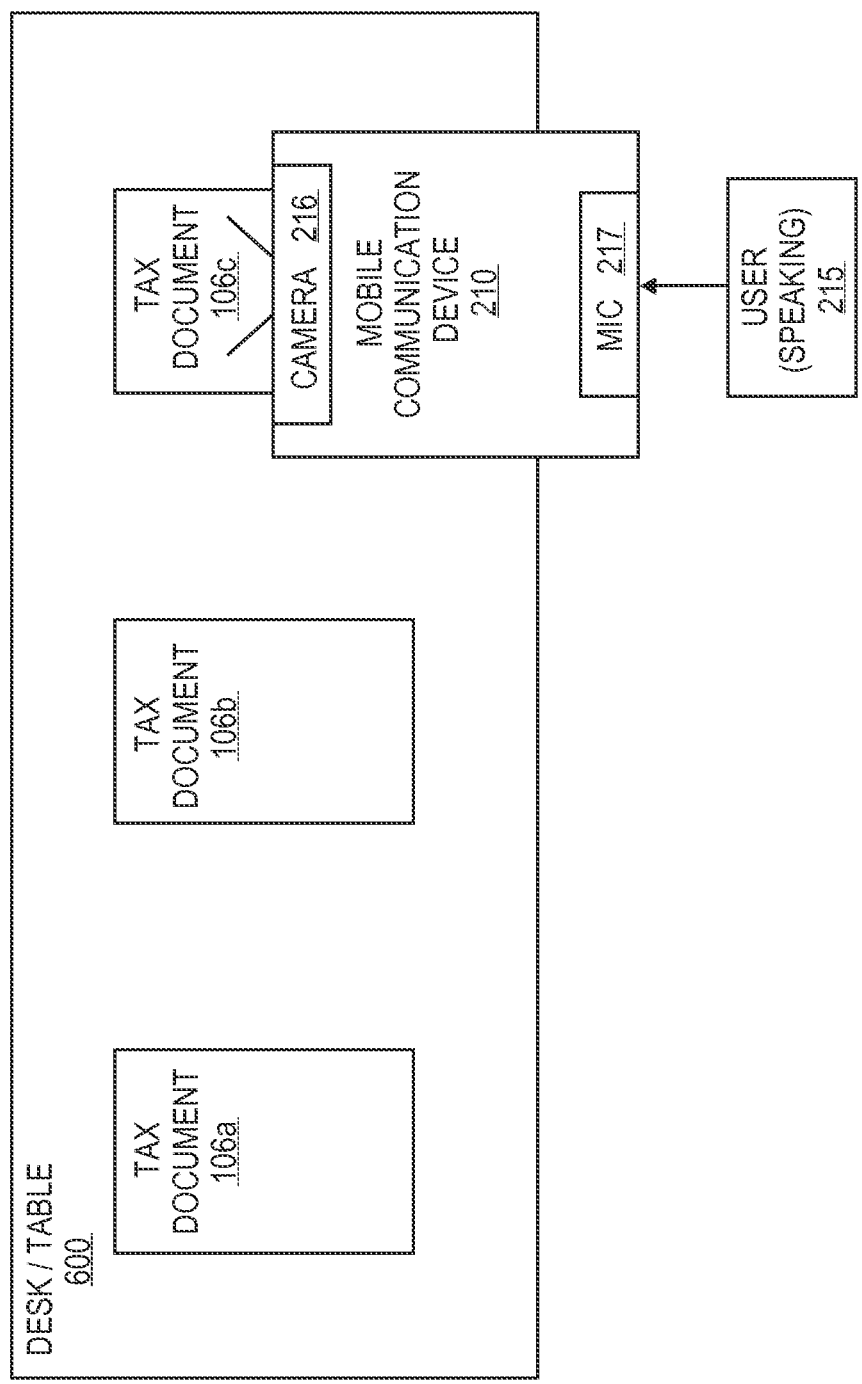

For example, referring to FIG. 5, the tax document 106 may be a Form W-2 tax document that includes tax data 122 such as the user's employer, wages and federal income tax withheld. While Form W-2 is provided as one example of a tax document 106 that may be processed according to embodiments, it will be understood that many other tax documents 106 may also be utilized.

Referring again to FIG. 4, according to one embodiment, the same mobile communication device 210 is used to acquire the video frames 102 and voice data 104 using the camera 216 and microphone 217 of the mobile communication device 210. For example, referring to FIGS. 6A-C, the user 215 may have three tax documents 106a-c that are positioned on a desk or table 600. The user 215 positions the mobile communication device 210 such that the first tax document 106a is in view of the camera 216, initiates acquisition of a video 100, and speaks during the video to describe the first tax document 106a or how the first tax document 106a is relevant to the electronic tax return 120. After the user 215 has completed describing the first tax document 106a, the user 215 may move or direct the mobile communication device camera 216 to the next or second tax document 106b, continues the video or initiates a second video, and speaks during the video to describe the second tax document 106b or how the second tax document 106b is relevant to the electronic tax return 120. Similarly, after the user 215 has completed describing the second tax document 106b, the user 215 moves or directs the mobile communication device camera 216 to the next or third tax document 106c, continues the video or initiates a third video, and speaks during the video to describe the third tax document 106c or how the third tax document 106c is relevant to the electronic tax return 120.

The user 215 may also have a stack of multiple tax documents 106, acquire a video and describe the first tax document 106a, then remove the first tax document 106a from the top of the stack to show the next or second tax document 106b, and so on for additional tax stacked tax documents 106. The user 215 may also hold tax documents in the air with one hand and hold the mobile communication device 210 in the other and record a video 100 while speaking. Thus, it will be understood that there are various ways the user 215 can be positioned or move, the mobile communication device 210 can be positioned or angled, and the tax documents 106 can be arranged or stacked in order to record videos 100 of tax documents 106 while user 215 describes the tax documents 106.

In another embodiment, the video 100 is received by the processor 214, e.g., read from a memory card of a camera or camcorder that was utilized to acquire and store the video 100, or in an electronic message from a computer having a web camera that was utilized to acquire the video 100 of tax documents 106. For ease of explanation, and not limitation, reference is made to acquiring, storing and processing a video 100 with the mobile communication device 210, but it will be understood that embodiments are not so limited.

Referring again to FIG. 3, and continuing with step 304, the processor 214 analyzes one or more frames 102 of the video 100 and the associated voice data 104 to determine the type of the tax document 106 and tax data 122 within the video frame 102 that is identified and used to populate fields of the electronic tax return 120.

Figure 7:
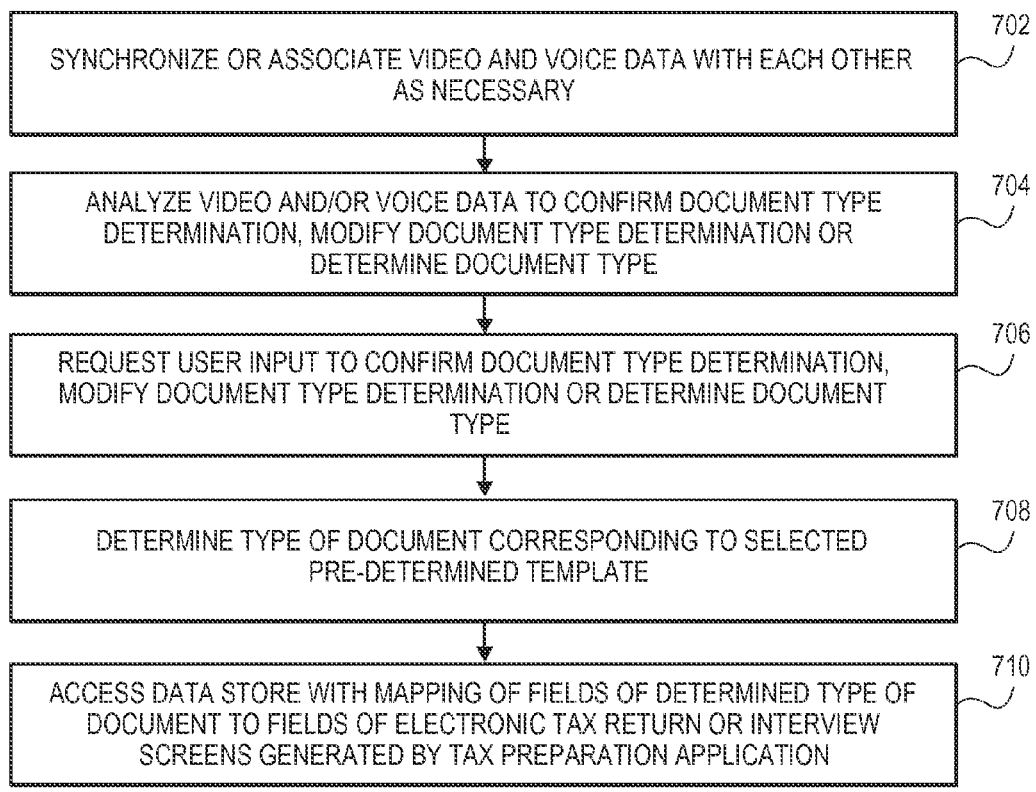
FIG. 7 illustrates an embodiment of a method for determining a type or name of a tax document captured in a video.
Figure 8:
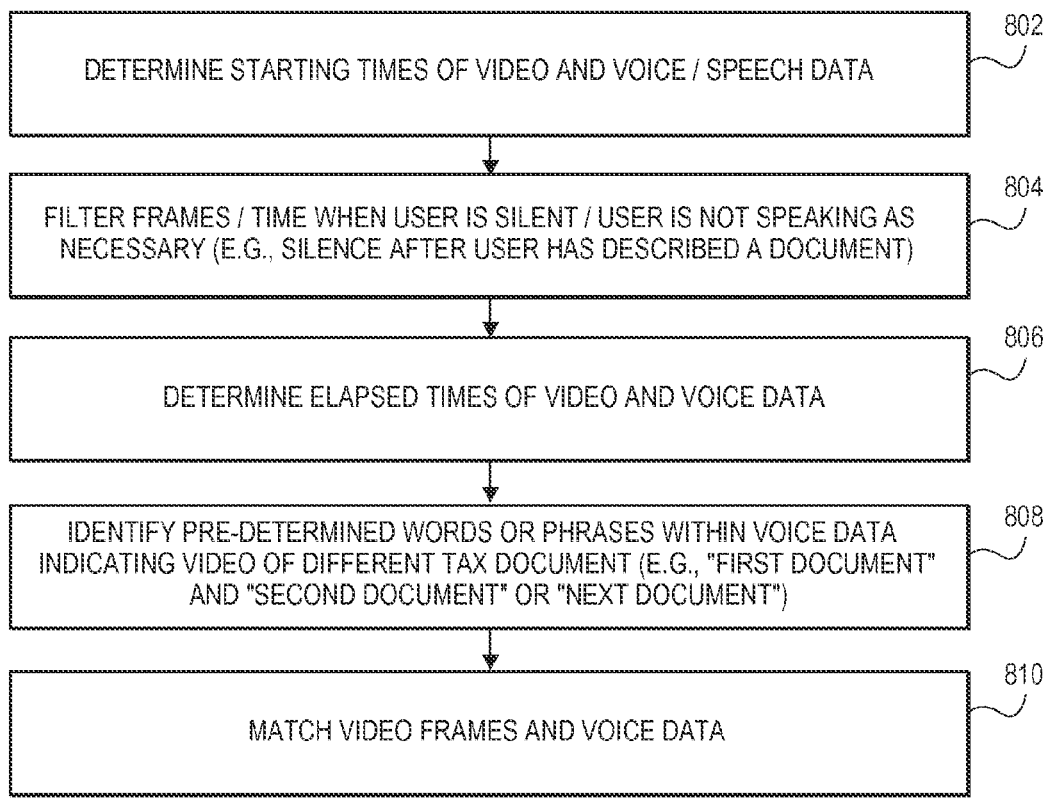
FIG. 8 illustrates steps that may be executed for synchronizing or associating video frames and voice data according to embodiments.
Figure 9A:
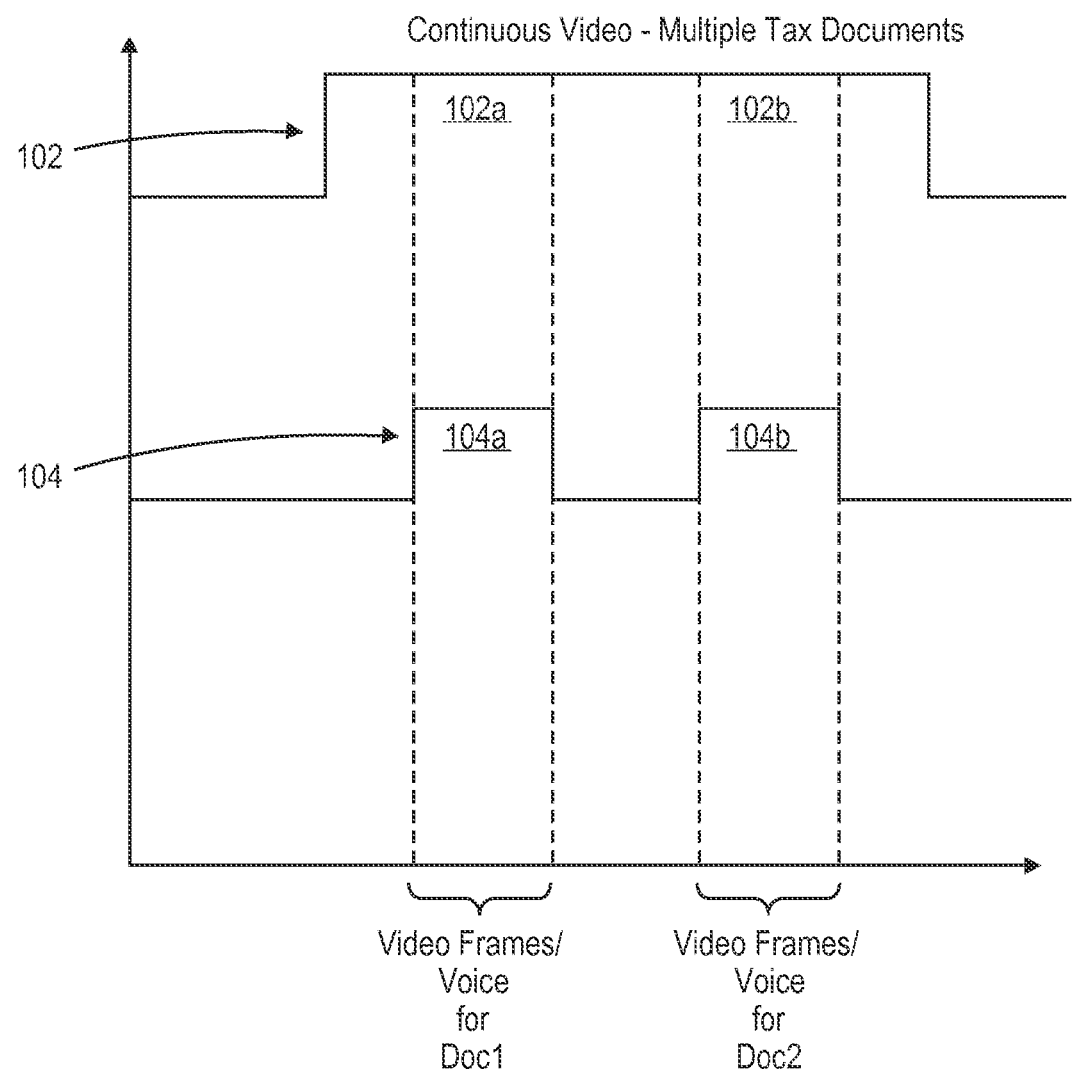
FIGS. 9A-B generally illustrate how video frames and voice data can be synchronized or associated with each other during a continuous recording or recording of different video clips according to embodiments.
Figure 9B:
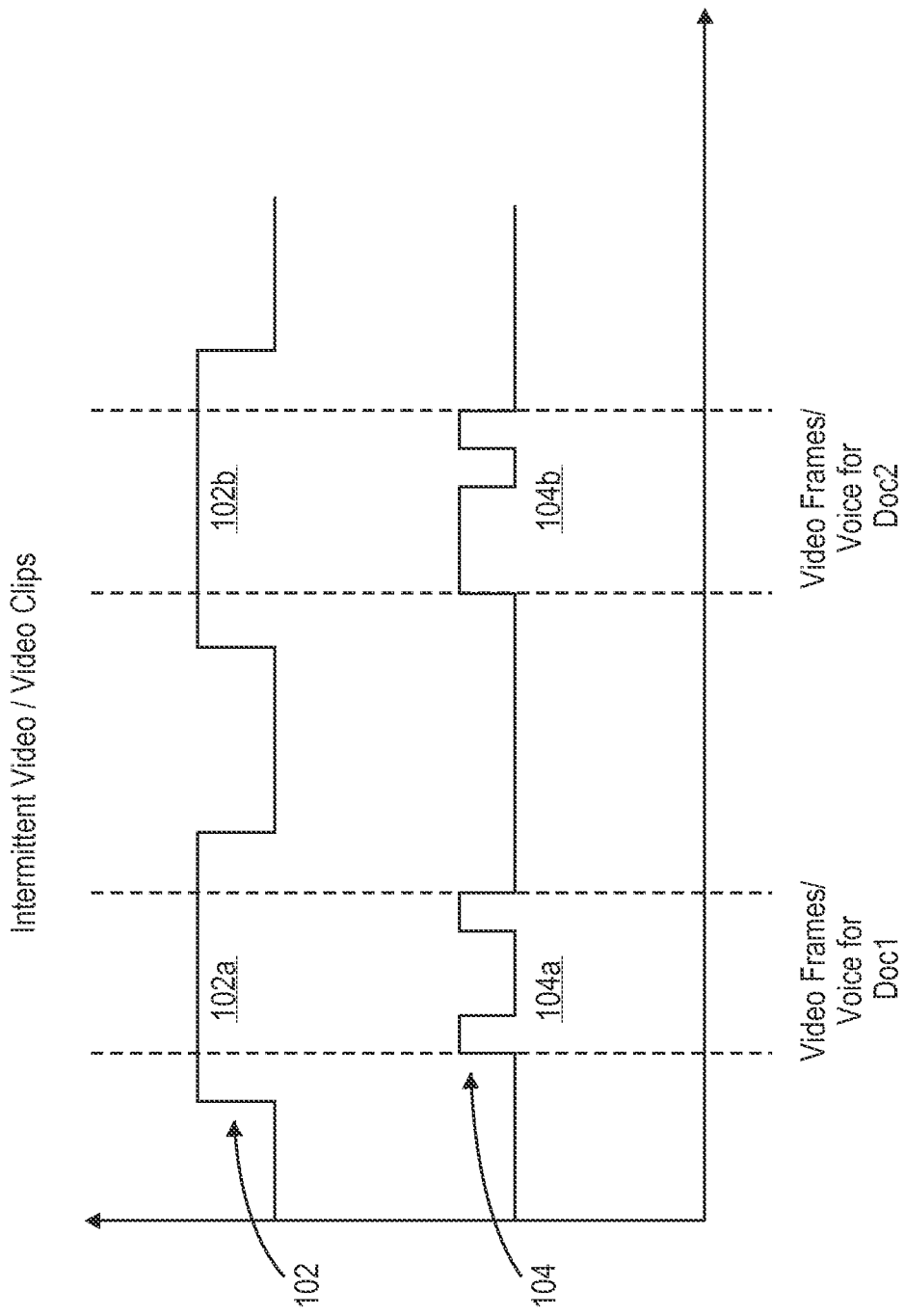
Figure 10:
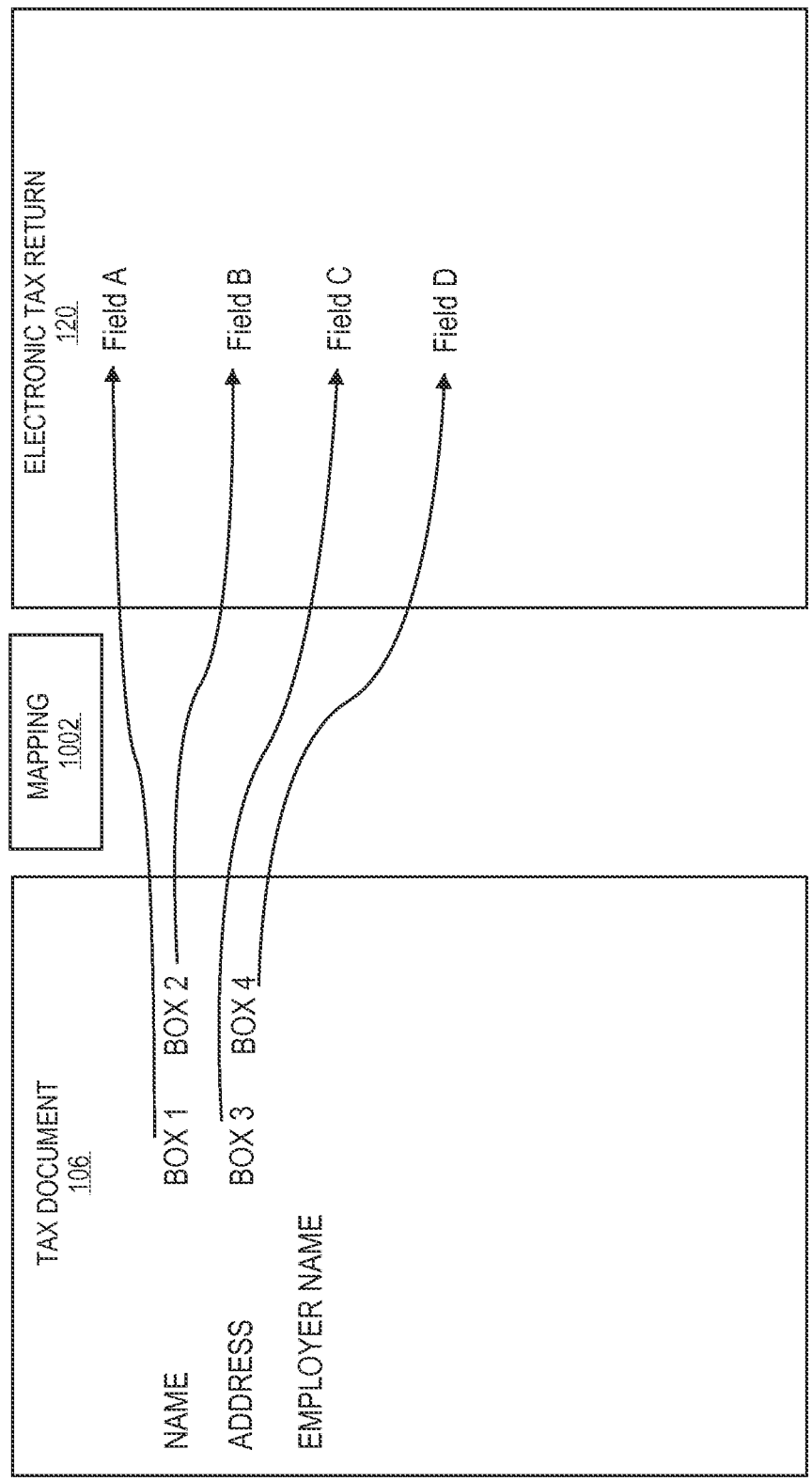
FIG. 10 illustrates how fields of a determined tax document are mapped to fields of an electronic tax return or interview screens generated by a tax preparation application according to embodiments.

Referring to FIG. 7, at 702, before video and voice analysis is performed and depending in the configuration of system components utilized, one or more frames 102 and voice data 104 may need to be synchronized or associated with each other if this has not already been done as a result of creation of the video 100. For this purpose, referring to FIG. 8, synchronization may involve one or more of steps 802-808 involving determining the starting times or when the video frames 102 and voice data 104 began, filtering frames 102 during periods of silence (no voice data spoken by user 215), determining the lengths or elapsed times of the video 100, frames 102 or voice data 104, or detecting a trigger or keyword indicating a transition to recording of a different tax document 106. For example, a trigger or keyword may be the user 215 speaking "next" or "next document" which is detected and identified for purposes of matching 810 or synchronization a video frames 102 of a corresponding tax document 106 and related voice data 104. The user may also indicate the end and/or beginning of recording of tax documents by tapping a user interface element displayed on a screen of the mobile communication device 210. Thus, it will be understood that one or more video frames 102 can be matched at 810, to or associated or synchronized with voice data 104 of the user 215, and that one or more of steps 802-808 may be performed and are provided as examples of how synchronization may achieved if needed. Further, it will be understood that this matching or synchronization may be performed with respect to a continuous video taken of one or more tax documents 106 or with individual videos or clips for each tax document 106, as generally illustrated in FIGS. 9A-B, wherein FIG. 9A shows how voice data 104a-b can be synchronized with respective groups of frames 102a-b during a continuous video recording, and FIG. 9B shows how voice data 104a-b can be synchronized with respective groups of frames 102a-b of multiple video clips.

Referring again to FIG. 3 (304) and FIG. 7 (704), the processor 214 analyzes video frames 102 and/or voice data 104 (video and voice processing described in further detail below with reference to FIGS. 11-16) to confirm the determination of the type of tax document 106, modify the document type determination, or determine the document type if the type cannot be determined via video analysis. According to one embodiment, the type of the tax document 106 is determined based on analysis of one or more video frames 102 such that when video frames 102 are to be analyzed, one or more frames 102 can be selected for analysis. Frame 102 selection can be based on, for example, criteria such as the first frame, a group of frames at the beginning of a recording, the first frame in which it is detected to include an image of tax document 106, a frame within a middle portion of the video or video clip (e.g., if it is assumed that this is when the user 215 is most focused on the tax document 106 after initial set up or introduction). Frame 102 selection may also be based on one or more frames having the best or having certain optical quality such as frames 102 having the highest contrast or clarity as determined by an optical analysis of frames 102 or application of an optical character recognition (OCR) process to the frames 102 and selection of one or more frames with the lowest error rates during recognition. Thus, while certain embodiments are described with reference to performing an OCR process after document type identification, it will be understood that OCR can be performed as part of the document type identification.

With continuing reference to FIG. 7, at 706, user input can be requested to confirm the document type determination, confirm a document type determination, or modify document type determination. At 708, and with further reference to FIG. 3 (306) and FIG. 10, having determined the document type, fields of that tax document 106 can be mapped 1002 to corresponding fields of the electronic tax return 120 or interview screens of the tax preparation application 211 utilized to prepare the electronic tax return 120 such that when the tax data 122 within the document 106 is determined, that determined tax data 122 can be populated within respective fields according to the mapping 1002. Further details regarding how document type determinations can be performed using video and/or voice processing are described with reference to FIGS. 11-16.

Figure 11:
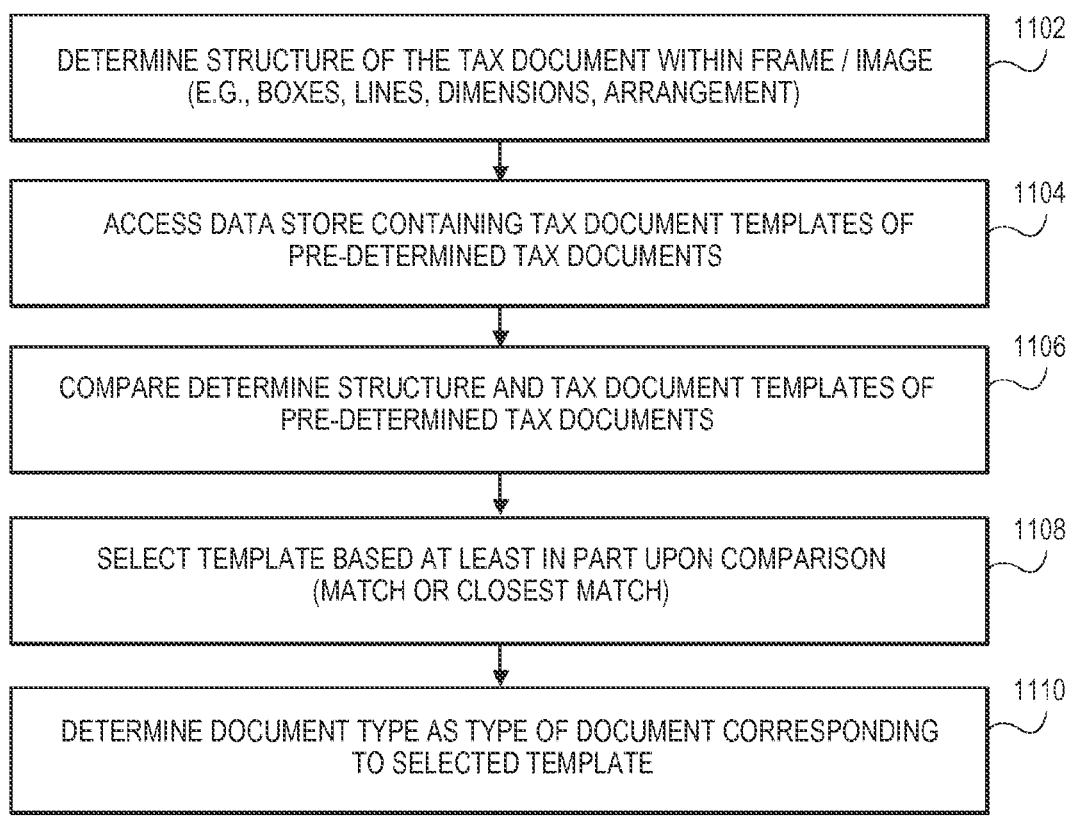
FIG. 11 illustrates an embodiment of a method for determining a type or name of a tax document based at least in part upon comparisons of determined tax document structure and tax document templates according to embodiments.
Figure 12:
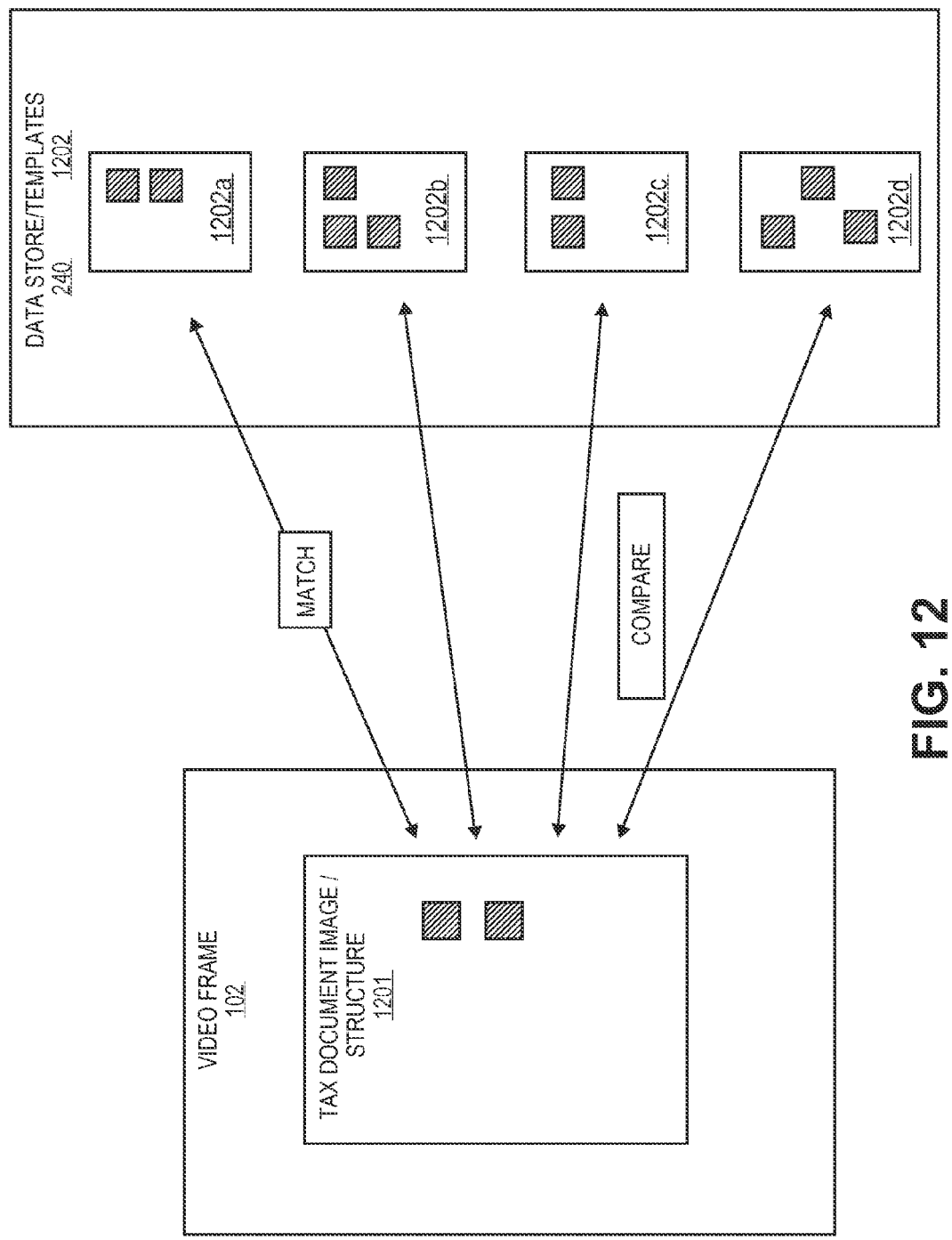
FIG. 12 further illustrates comparison of determined tax document structure and tax document templates according to embodiments.

Referring to FIGS. 11 and 12, having selected one or more frames 102 of the video 100 of one or more tax documents 106 that was received or acquired, one or more frames 102 are processed to determine what type of tax document 106 has been imaged or recorded. For this purpose, at 1102, the processor 214 determines the configuration or structure 1201 of the tax document 106 that appears within the frame 102. The configuration, structure 1201 or other identifying data may involve boxes, lines, sections, symbols, and dimensions, location and arrangement thereof.

At 1104, the processor 214 accesses the data store 240 containing templates 1202 of pre-determined tax documents 106. For ease of explanation and illustration, four tax document templates 1202a-d are illustrated, but it will be understood that there may be hundreds and thousands of templates 1202. For example, referring again to FIG. 5, Form W-2 has a certain dimensions, field configuration and dimensions, and a template 1202 may include the structure of Form W-2 (boxes, lines) and any unique identifiers or symbols or alpha-numeric data (e.g., popular form names).

At 1106, and as generally illustrated in FIG. 12, the processor 214 compares the determined structure 1201 and the templates 1202a-d (generally, template 1202), selects a template 1202 as a match or closest match, and at 1110, determines the type of the document 106 that was recorded based at least in part upon the document type of the selected template 1202.

According to one embodiment, processing of one or more frames 102 or static images of a video 100 may be used to determine the type of tax document 106 within the video or frame 102. According to another embodiment, the received voice data 104 is used to provide additional contextual information or meaning to the video analysis in order to determine what type of tax document 106 is captured in the video 100. Voice data 104 may include various types of information about the tax document 106 or about its relevance to the electronic tax return 120 such as describing the tax document 106 by type or name, the source of the tax document 106, or types of tax data 122 within the tax document 106. For example, the user 215 may take a video 100 of a first tax document 106a and explain "This is my W2 from my prior employer" and then when taking a video of a second tax document 106b, continue explaining "This is my W2 from my current employer—I found a new job last year." As another example, the user 215 may explain "I got married" or "We had our second child last year."

Figure 13:
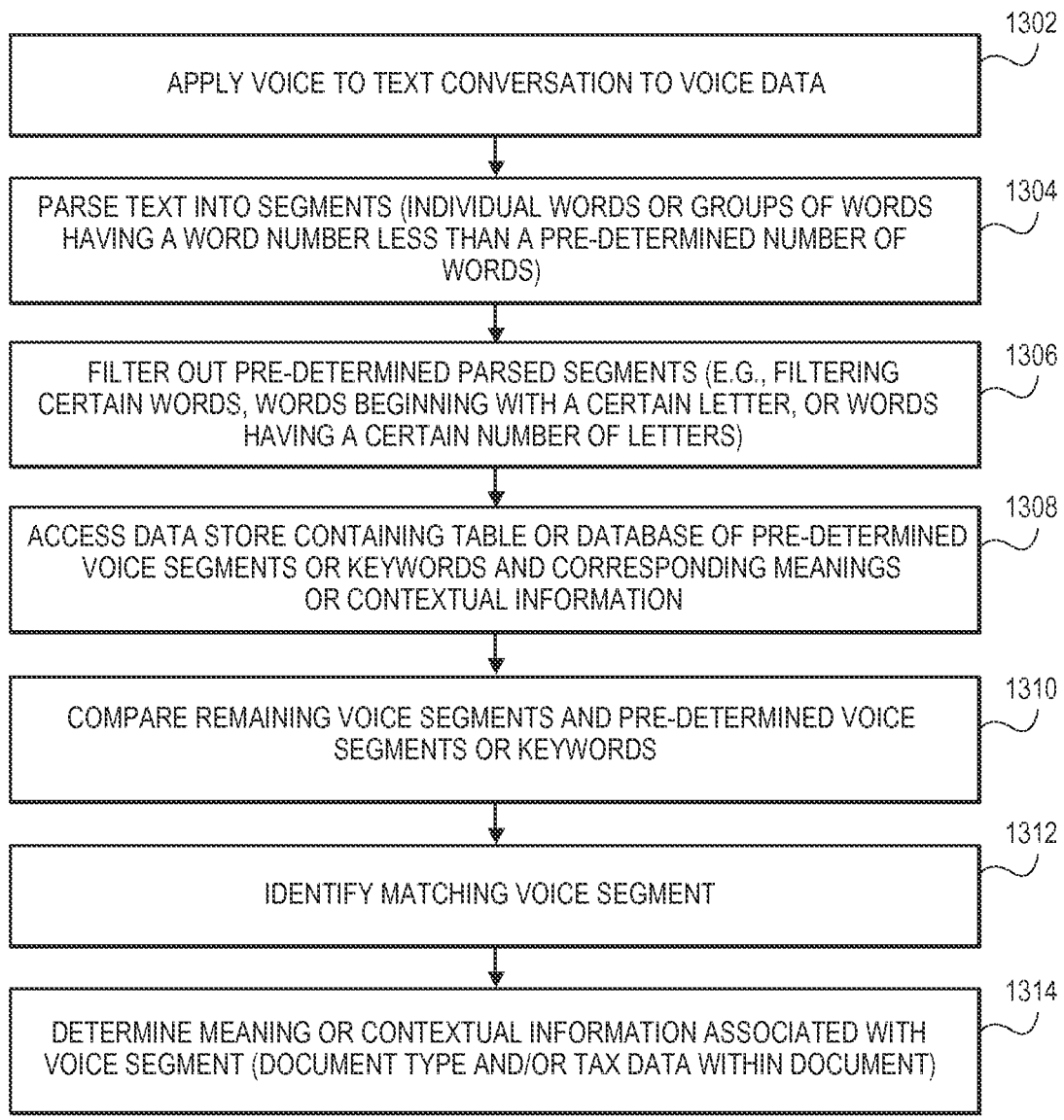
FIG. 13 illustrates a method for processing voice data according to embodiments.
Figure 14:
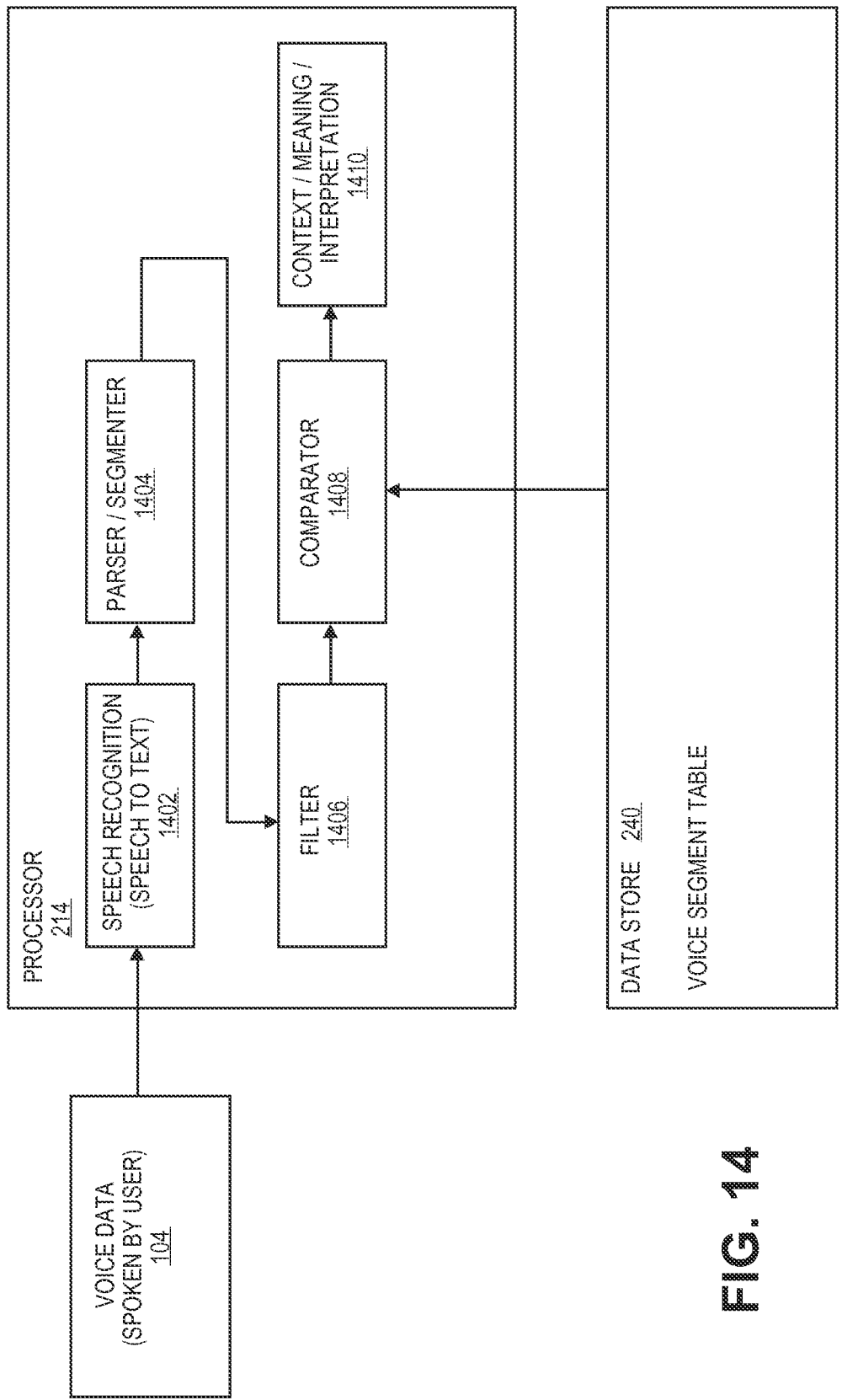
FIG. 14 further illustrates one manner in which voice data can be processed according to embodiments.

Referring to FIG. 13 and with further reference to FIG. 14, one method for processing voice data 104 for this purpose includes, at 1302, the processor 214 receiving the analog voice data 204 and applying speech recognition or voice to text conversion 1402. At 1304, the processor 214 parses 1404 the text into segments as necessary (referred to as segment or voice segment). A segment may be an individual word or groups or words having number of words less than a pre-determined number of words. At 1306, the processor 210 may filter 1406 or remove certain segments so that subsequent processing is applied to selected segments and not filtered segments. Filtering 1306 may be applied to certain words, words beginning with a certain letter or words having a certain number of letters, e.g., based on a determination that when a user 215 describes the most common tax documents 106, such descriptions do not involve these filtered segments, or do so a small percentage of the time. For example, the voice processor may filter "a," "the" or words determined as not providing useful information about the tax document 106, whereas terms such as "married," "children," "mortgage," "interest," "deduction," "wages," "new," names of tax documents would not be filtered, and the processor 214 may also be configured to access the data store 240 containing a list of table of selected segments (such as "married," "children" etc.) that should not be filtered and should be subsequently processed such as names of tax documents (W2, 1099) or other information, terms, phrases or segments determined (e.g., empirically, or based on terms appearing within tax documents) or selected as being pertinent to the tax document 106.

At 1308, and with further reference to FIG. 15, a comparator 1408 of the processor 214 accesses the data store 240 containing table or database 1500 including columns 1501-1503 for pre-determined voice segments and corresponding meanings or contextual information associated with those voice segments and/or relevant or potential relevant tax documents 106 associated with those segments. The meanings or contextual information may, for example, be created by the administrator of the system or determined empirically. Thus, as shown in FIG. 15, the table or database 1500 includes column 1501 with various segments and their corresponding meaning or context or relevance to tax documents 106 or identification of a tax document 106. At 1310, the comparator 1408 compares voice segments of the voice data 104 and the pre-determined voice segments in column 1501 of the table or database 1500, and at 1312, identifies any matches, and selects those rows or table entries and determines the corresponding meaning, context, interpretation or document identification 1408 with the data in column 1502 and/or a relevant or potentially relevant tax document in column 1503 in the table 1500 at 1314.

Thus, the type of the tax document 106 that was recorded may be determined by analyzing video or frames 102 thereof or by analyzing both video or frames 102 thereof and voice or speech data 104 provided by the user 215 during recording of the video 100 such that the voice or speech data 104 provides additional meaning, identification or confirmation of the video analysis.

Figure 16:
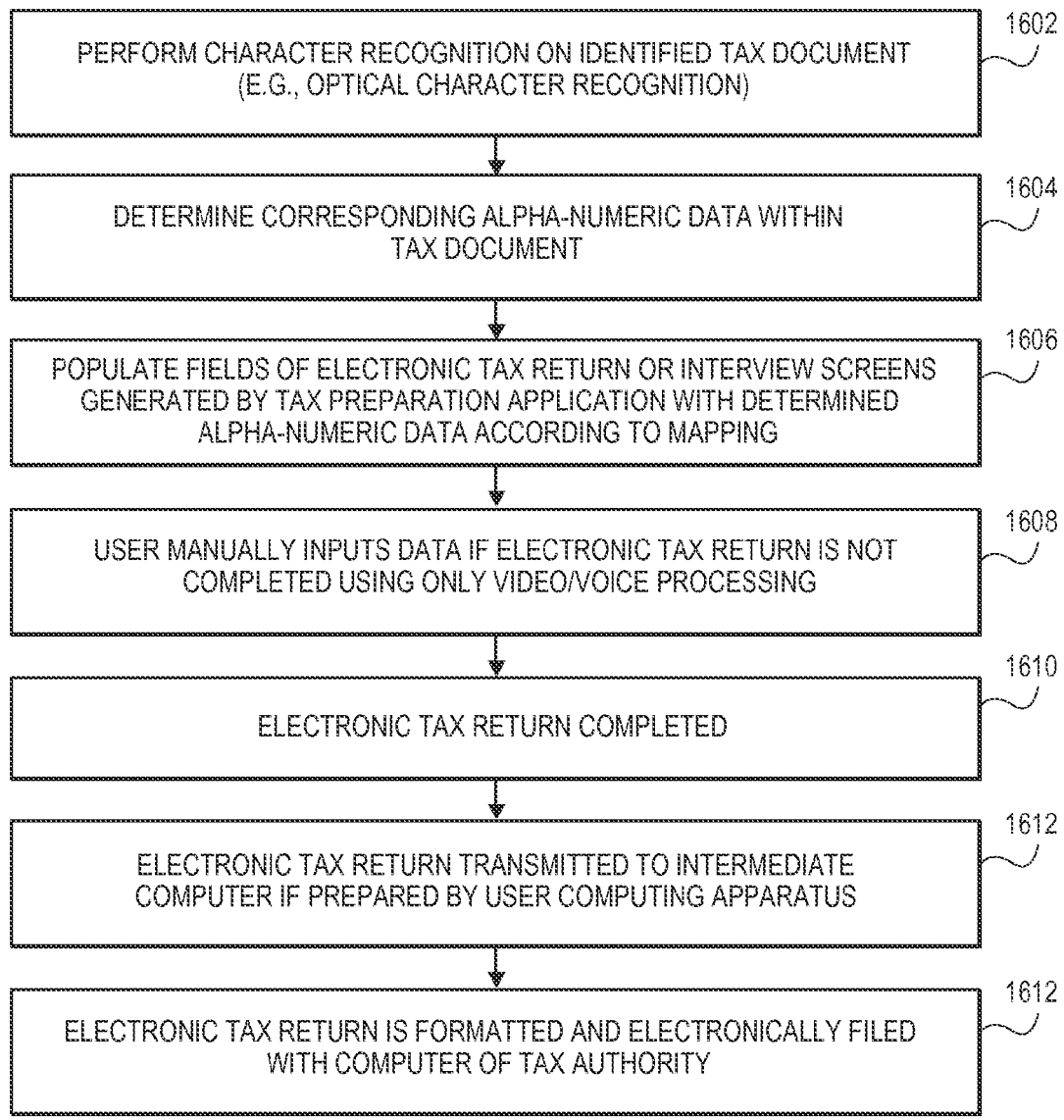
FIG. 16 illustrates steps for populating, formatting and filing electronic tax returns prepared according to embodiments.

Referring again to FIGS. 3 and 10, and with further reference to FIG. 16, having determined the document type and having mapped 1002 sections of the tax document captured within the video frame 102 to fields of the electronic tax return 120 or interview screens of the tax preparation application 211, at 1310/1602, the processor 214 executes a further recognition process, e.g., Optical Character Recognition (OCR), which is applied to the video frame 102 to determine tax data 122 contained therein. Voice data 104 may also be analyzed for this purpose.

At 1604, the processor 214 determines corresponding alpha-numeric tax data 122 contained within tax document 106, and at 1606, populates the respective identified fields of electronic tax return 120 or interview screens generated by tax preparation application 211 with determined alpha-numeric tax data 122 according to the determined mapping 1002. At 1608, if the electronic tax return 120 is not completed exclusively with the video or video and voice processing, then those fields can be tagged by the processor 214, and the user 215 can then be presented with those fields or tax return documents and import or manually enter additional tax data into the electronic tax return 120 such that at 1610, the electronic tax return 120 is eventually completed, transmitted to the intermediate computer 220 at 1612, which formats and electronically files the electronic tax return 120 with the computer 230 of the tax authority 243 at 1614.

Figure 17:
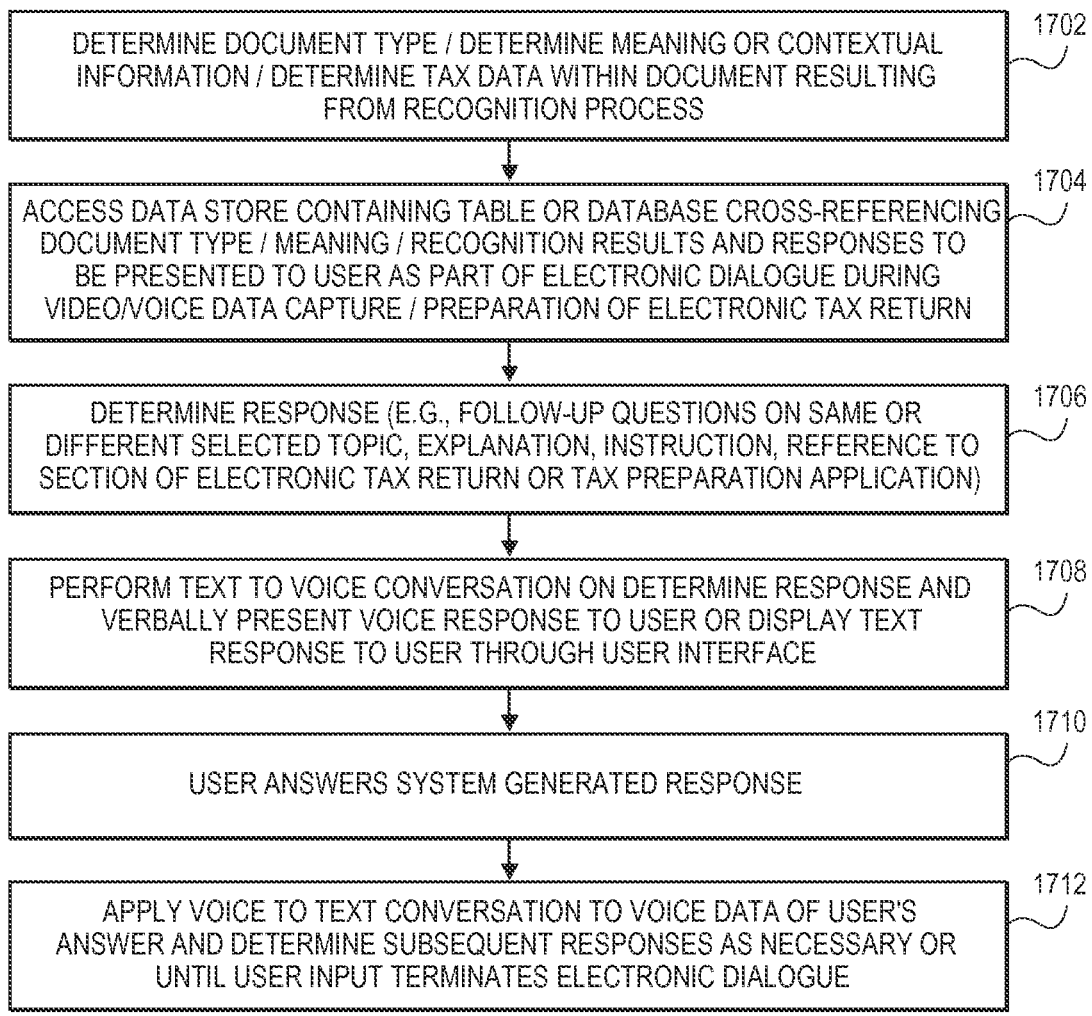
FIG. 17 illustrates an embodiment directed to generating an interactive electronic dialogue and communicating with a user.
Figure 18:
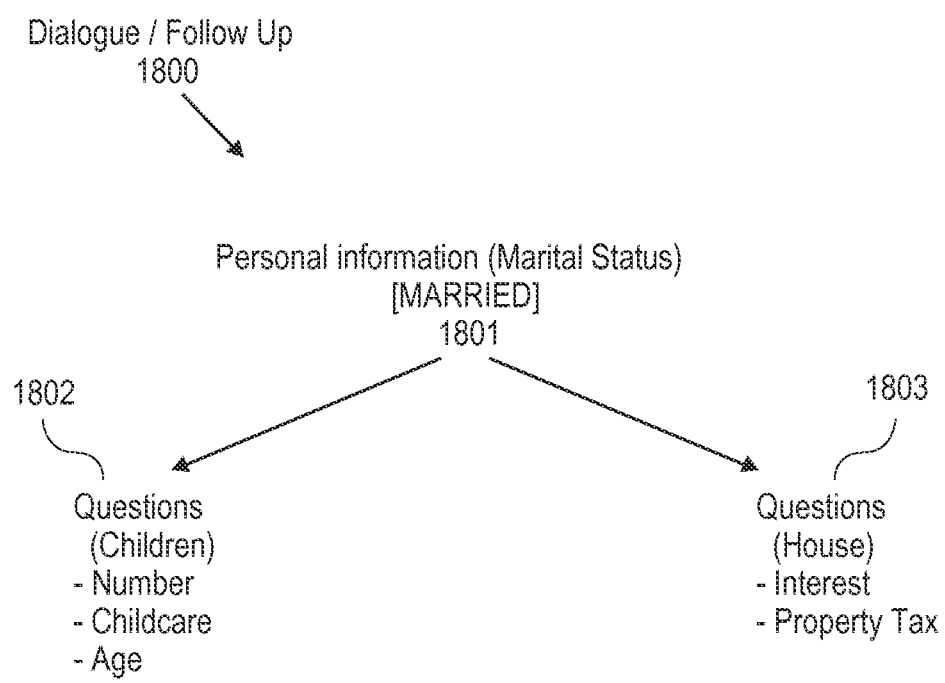
FIG. 18 generally illustrates a tree structure of tax-related topics that may be utilized to determine questions, instructions or explanations to present to the user as part of an interactive electronic dialogue.

Referring to FIGS. 17 and 18, a further embodiment, which may be utilized in conjunction with embodiments described above, involves the processor 214 generating questions or responses and engaging the user 215 in an interactive electronic dialogue while the user 215 is involved in one or more steps of embodiments such as recording tax documents 106 or providing verbal descriptions of the tax documents 106. In one embodiment, at 1702, during steps involving video and/or voice data processing involving document type determination, determining the meaning or contextual information of voice data 104, or determining tax data 122 within a tax document 106 during a recognition process, the processor 124 may process the results of these processing steps and at 1704, access the data store 240 containing a tree structure, table or database 1800. The tree structure, table or database 1800 cross-references document type/meaning/recognition results and system responses based on those types of tax documents 106 or tax data 122 that are to be presented to the user 215 as part of electronic dialogue with the user 215.

For example, the processor 124 may determine from the tax document 106 or recognition results that the user 215 is married. The processor 124 at 1706 then determines a corresponding electronic response to this married determination in the form of follow-up questions on same marriage topic or a different selected topic, explanation, instruction, reference to section of electronic tax return or tax preparation application. For example, as shown in FIG. 18, upon determining that the user 215 is married, the processor 214 may access a tree or other organization data structure 1800 of follow up questions concerning tax-related issues that often arise with personal information such as marital status 1801, such as whether they have children 1802 (e.g., childcare expenses) or own a house 1803 (e.g., mortgage interest paid, property tax paid). While FIG. 18 illustrates a tree structure with follow up questions concerning two topics or categories, it will be understood that the tree structure may involve more topics and more detailed questions and further follow-ups for each category.

At 1708, having identified the electronic response(s) to be presented to the user 215, the processor 214 performs text to voice conversion such that the response can be verbally presented to the user 215 via a speaker of the mobile communication device or other computing apparatus utilized. This is particularly beneficial when users 215 have a mobile communication device since such devices often have smaller screens such that it may be difficult or less convenient to display the follow up questions via a user interface displayed on a screen of the mobile communication device, but it will be understood that the follow-up questions presented by the processor 214 can also be displayed to the user 215.

In the embodiment involving electronic dialogue in audible form, at 1710, the user 215 answers the computer generated question or provides an answer to a computer generated description, instruction or explanation. For example, the computer generated response or question may be "I noted you are married, do you have children?" in response to which the user 215 would audibly answer "Yes" or "No" for example, or provide a more detailed explanation "Yes, and we adopted a child last year." At 1712, the processor 214 converts the voice data or answer 104 into text and processes the text to determine the meaning of the user's answer, and determine subsequent follow up questions or responses as necessary, such as asking about additional tax documents that may be related to the user's answers. For example, if the user responded "Yes, and we adopted a child last year" the processor 214 may continue with additional follow-ups with audible questions concerning potential tax deductions or credits pertaining to adoption or other tax topics that may be related to having a child such as being married, deductions for mortgage interest, etc.

While certain embodiments involve determining what to ask or explain to a user given determined tax documents 106 or tax data 122, the interactive electronic dialogue may also be based on questions or statements made by the user 215. Accordingly, it will be understood that FIG. 17 is provided as one example of how embodiments may be implemented, and that the electronic dialogue may be keyed to document type or tax data determinations and/or other voice data provided by the user 215.

Figure 19:
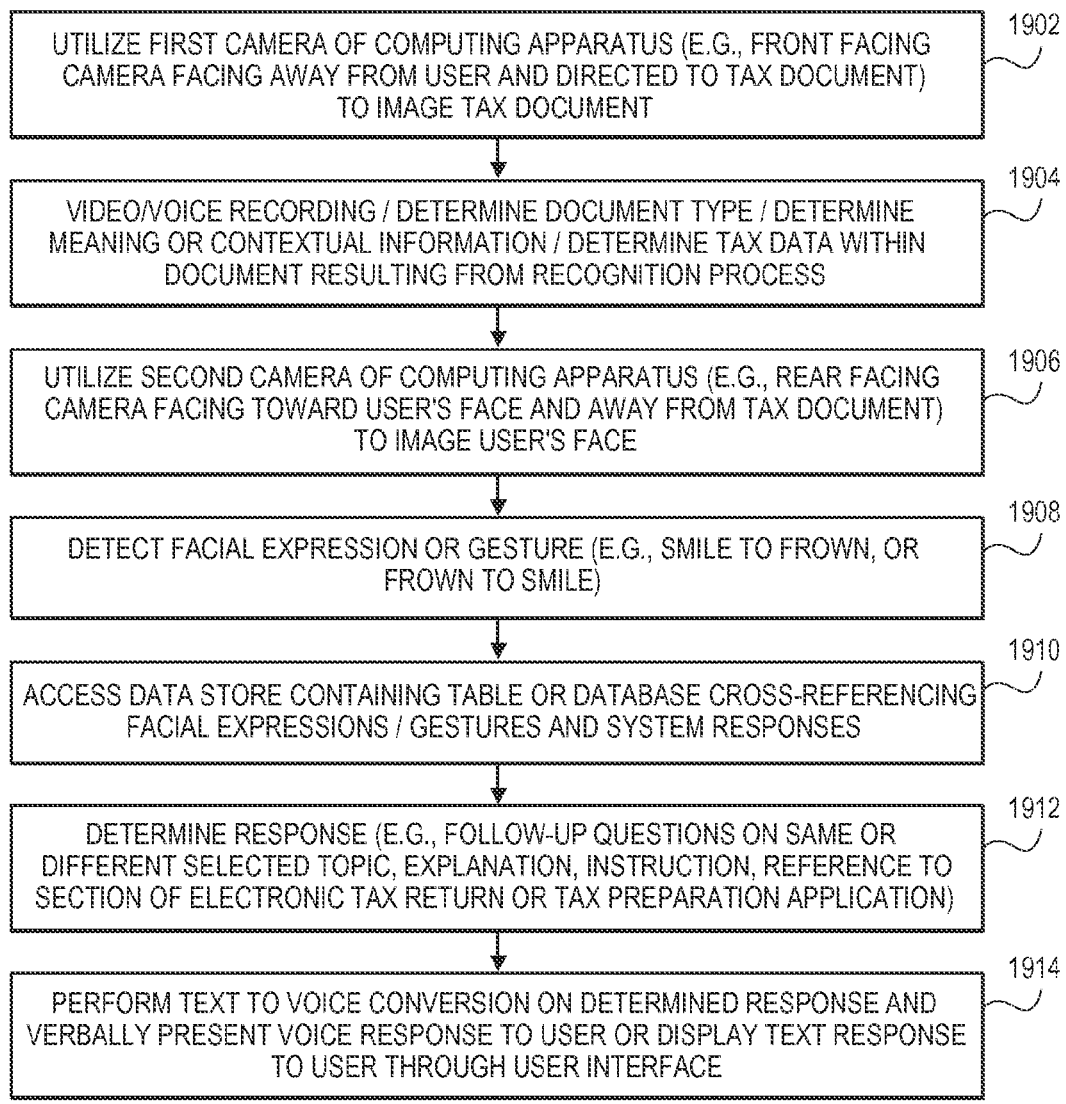
FIG. 19 illustrates an embodiment of a method for utilizing multiple cameras for recording a document and performing facial expression or gesture recognition and determining responses to be communicated to the user based at least in part upon the detected facial expression or gesture.
Figure 20:
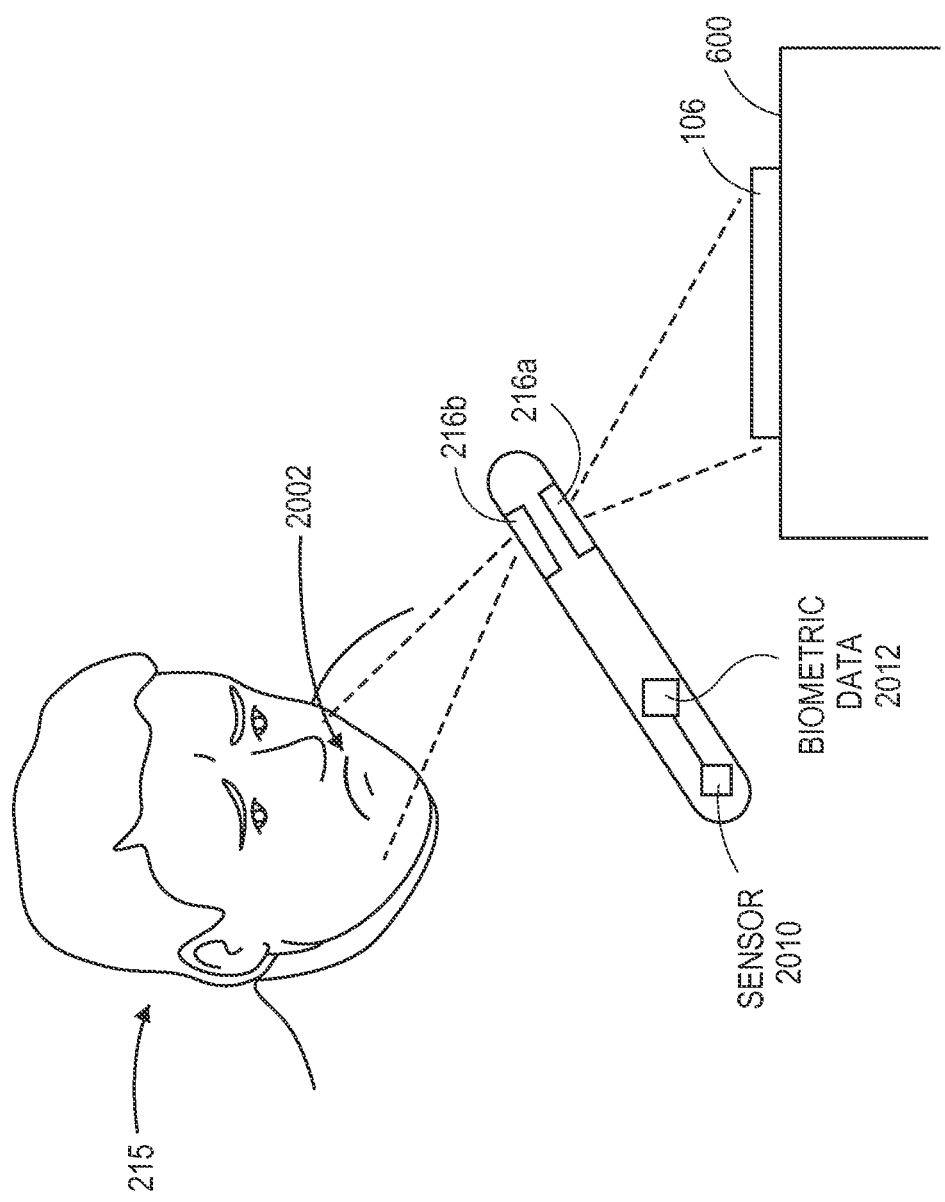
FIG. 20 illustrates how a user may manipulate a mobile communication device with opposite facing cameras to record a video of a tax document with one camera while the user's facial expression or gesture recognition is detected with another camera.
Figure 21:
FIG. 21 illustrates a table or database including data of facial expressions or gestures and corresponding responses to be communicated to the user.

Referring to FIGS. 19-21, a further embodiment that may be utilized in conjunction with various embodiments described above involves the processor 214 detecting a facial expression, gesture, or other non-verbal communication of the user 202 (generally, facial expression 2002) during various steps described above such as during recording the video 100, the user 215 speaking or listening to follow-up questions presented by the processor 214 during the interactive electronic dialogue, or the user 215 answering such follow-up questions, and the processor 214 initiating an action such determining and presenting an explanation or instruction for the user 215 in response to the detected facial expression 2002.

For this purpose, in the illustrated embodiment involving a mobile communication device 210 such as a smartphone or a tablet computing device, different cameras or image/video acquisition elements (generally, cameras 216a, 216b) may be utilized—one for taking a video of tax documents 106, the other for detecting a facial expression 2002 of the user 215. Facial expressions 2002 may involve the user's eyes, lips/mouth, forehead, for example, and may be detected by analyzing the facial structure or attributes within a video frame 102 and comparing that detected structure or attribute to pre-determined facial expression templates or other resource.

In the illustrated embodiment, the mobile communication device 210 includes a first or front facing camera 216a and a second or rear facing camera 216b. The video 100 or images acquired by these cameras 216 are provided to the processor 214 for analysis and facial expression 2002 detection, one embodiment of which is described below.

At 1902, the first camera 216a of the mobile communication device 210 or other computing apparatus (e.g., front facing camera facing away from user 215 and directed to tax document 106) is used to acquire a video 100 of one or more tax documents 106 as described above. At 1904, during one or more stages of embodiments involving recording of video or voice/speech, document type determination, determining a meaning or contextual information of voice data, and determining tax data 122 within a tax document 106 resulting from recognition process, at 1906, the second camera 216b (e.g., rear facing camera facing toward user's face and away from tax document 106) is used to take a video or photograph of the user's face. As discussed above, the video may include frames 102 comprising static images. At 1908, the processor 124 detects a facial expression 2002 or change thereof (e.g., detection of a frown, detection of a smile, detection of a change from a smile to a frown, a change from a frown to a smile, forehead wrinkles, or a smirk). With further reference to FIG. 21, at 1910, the processor 214 accesses the data store 240 containing table or database 2100. The table or database 2100 includes columns 2101-2103 of data for cross-referencing the facial expressions or other non-verbal communications 2002 or changes thereof, and how the processor 214 should respond given the detected facial expression 2002, which is indicative of a meaning, feeling, reaction or emotion. For example, as shown in FIG. 21, embodiments may utilize a table or database 2100 with data or columns 2101-2103 for detected facial expressions or gestures, a description of a corresponding emotion or reaction the user may be experiencing, and how the system should respond to the expression or gesture, or emotion or reaction. In the illustrated embodiment, for example if the user's facial expression 2002 is a frown, expressing frustration or disappointment, the table 2100 may be consulted by the processor 214 to determine that some type of positive reinforcement or message should be communicated to the user 215.

At 1912, the processor 214 utilizes the table or database 240 to determine how the system should respond to the detected facial expression 2002, given the meaning, feeling or emotion associated with the expression or gesture, and at 1914, the determined question, instruction or explanation of the system response is converted from text to voice, and the voice version of the question, instruction or explanation is then audibly presented to the user 215 as part of the interactive electronic dialogue.

For example, if the facial expression 2002 is one of fear or worry, such as a frown or facial expression showing tension in the user's face, the processor 214 may determine that a response reassuring the user 215 that the process is proceeding as it should can be selected and presented. As another example, if the user 215 changed jobs during the course of a year, and during the interactive electronic dialogue, the processor 214 may verbally explain "User, you will receive a $1,500 this year, but we were not able to take advantage of your job search expenses because the IRS requires that those expenses require you to itemize." Upon hearing this news, the user 215 may give a slight frown. Upon detecting the frown, and determining that this facial expression 2002, or change from a smile to a frown has a negative meaning, the processor 214 may respond with explaining "However, the good news is that you were able to receive a larger refund by not itemizing—if you itemized to deduct job search expenses, your refund would be reduced from $1,500 to $1,300." In response to hearing this good news, despite not being able to deduct job search expenses, the user 215 nods satisfyingly and/or smiles, and upon detecting this, the processor 214 may determine that it can proceed to electronic dialogue for the next topic. If the initial response does not address the negative facial expression 2002, further responses can be selected and communicated as necessary.

Figure 22:
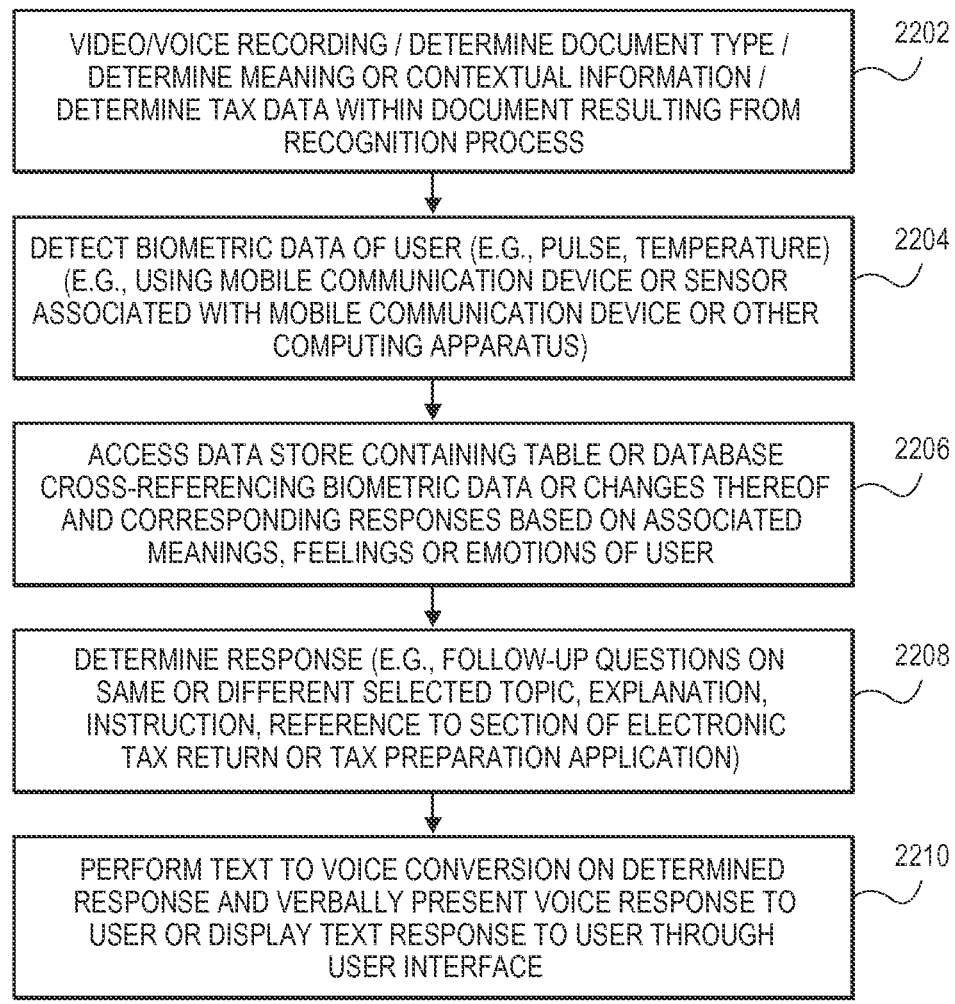
FIG. 22 illustrates an embodiment of a method for detecting biometric data of the user and determining responses to be communicated to the user based at least in part upon the detected biometric data.
Figure 23:
FIG. 23 illustrates a table or database including data biometric attributes and data thereof and corresponding responses to be communicated to the user.

With continuing reference to FIG. 20, and with further reference to FIGS. 22-23, a further embodiment that may be utilized in conjunction with various embodiments described above involves detecting one or more types of biometric data 2012 of the user 215 such as pulse rate of the user 215. Biometric data 2012 may be detected during, 2202, recording a video, speaking, listening to follow-up questions presented by the system, or answering such follow-up questions, and initiating an action or response such as determining and presenting an explanation or instruction for the user 215 in response to the detected facial expression 2002.

For this purpose, in one embodiment, a camera 216 and/or biometric data or sensor 2010 of the mobile communication device 210 may be utilized to determine or acquire biometric data 2012. While the sensor 2010 is shown in the context of embodiments involving facial expression 2002 detection, embodiments involving facial expressions and biometric data may be utilized independently or separately of each other, or utilized in conjunction with each other. Accordingly, FIG. 20 is merely provided as an example to show the mobile communication device 210 including a type of sensor 2010 for detecting biometric data 2012.

Continuing with reference to FIG. 22, at 2204, biometric data 2012 is detected or received by the processor 214. For example, embodiments may leverage the camera 216, sensors 2010 and applications executing on the mobile communication device 210 for detecting a pulse rate of the user 215. In one application, the biometric sensor 2010 is in the form of or involves the user 215 placing a fingertip over a lens of the front facing camera 216 while a light is emitted by the camera 216. Biometric data 2012 in the form of pulse rate is detected, e.g., using similar techniques utilized in pulse oximeters.

In other embodiments, the biometric sensor 2010 may be a thermal sensor for detecting biometric data 2012 in the form of temperature such that when the mobile communication device 210 is held by the user 215, or otherwise positioned over a part of the user's body, the temperature of the user 215 is determined. Other biometric data may include the user's skin color (e.g., whether the user is pale or red) or change thereof, and whether the user is perspiring. These types of biometric data 2012 are indicative of a certain feelings or reactions to embodiment processing, electronic dialogue or certain questions or explanations presented to the user 215.

In one embodiment, biometric data215 such as the pulse or temperature of the user 215 of the mobile communication device 210 is detected while the user 215 is holding the mobile communication device 215, whereas in other embodiments, the user 215 may have or be wearing a separate biometric sensor (e.g., integrated into clothing), and communications between the worn sensor and a mobile communication device 210 may be by wireless communications such as BLUETOOTH communications. Embodiments may involve detection of one or multiple types of biometric data, and in the case in which multiple types of biometric data are acquired, analysis and processing may be based on, for example, a weighted average or other statistical methodology or priority to a certain type of biometric data if a detected reading surpasses a pre-determined threshold.

With further reference to FIG. 23, showing the example of biometric data 2012 in the form of pulse rate, the processor 214 may access the data store 240 containing a table or database 2300 with columns 2301, 2302 cross-referencing pulse rate or other biometric data 2012 or changes thereof and corresponding system responses to be presented to the user 215. Upon detecting the pulse rate, the processor 214 searches the database or table 2300 for a match or matching range of pulse rates, to determine the response at 2108. The response 2108 is converted from text to voice and audibly presented to the user 215. For example, if it is determined that the user's pulse rate is high, or increasing relative when the recording and description of tax documents 106 began, the system can identify and present a response related to addressing user 215 concerns or reassuring the user 215 that the video 100 and voice inputs 104 are being utilized to successfully prepare the electronic tax return 120.

Figure 24:
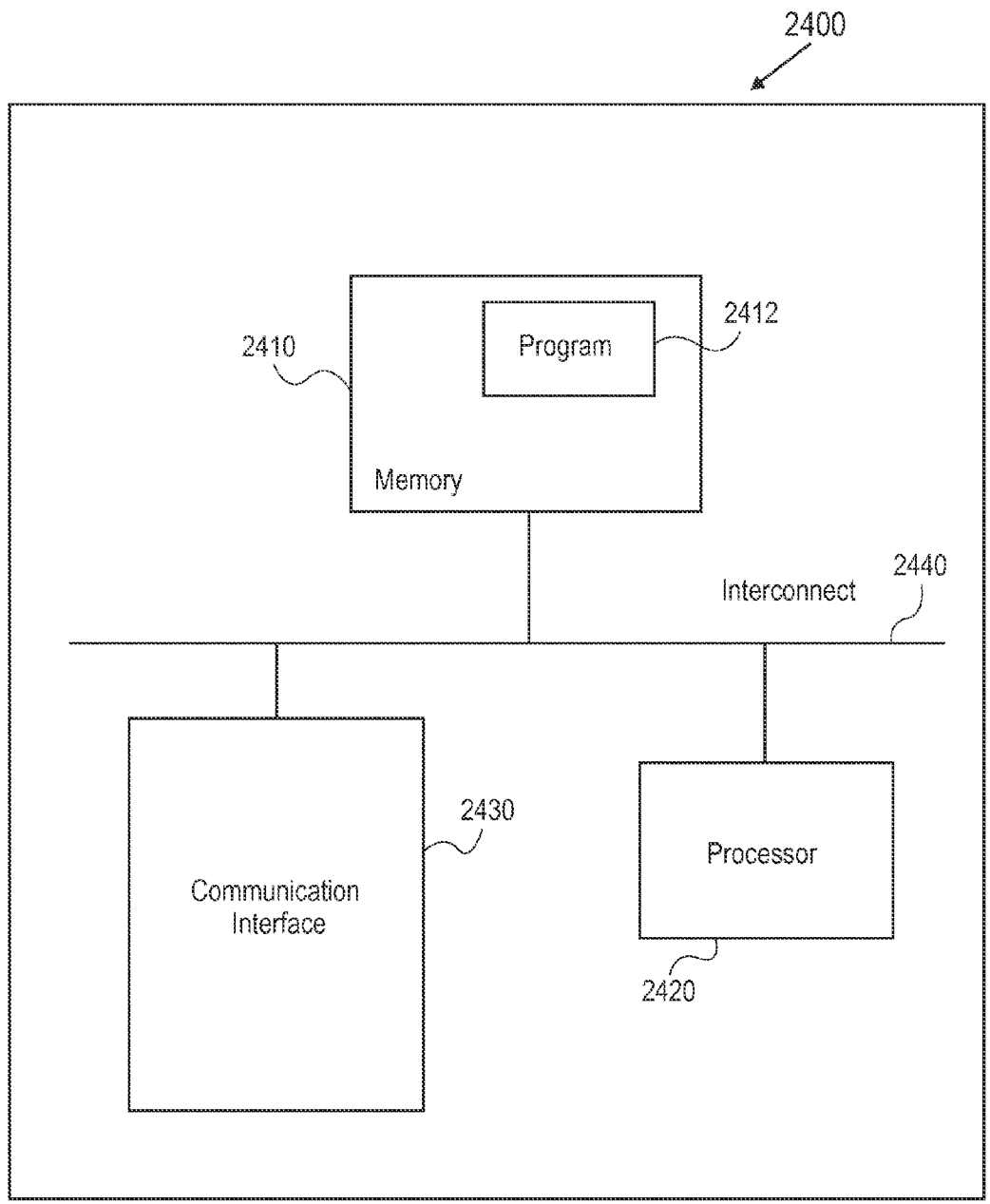
FIG. 24 is a block diagram of components of a computing apparatus or system in which various embodiments may be implemented or that may be utilized to execute various embodiments.

FIG. 24 generally illustrates components of a computing device 2400 that may be utilized to execute embodiments and that includes a memory 2410, account processing program instructions 2412, a processor or controller 2420 to execute account processing program instructions 2412, a network or communications interface 2430, e.g., for communications with a network or interconnect 2440 between such components. The memory 2410 may be or include one or more of cache, RAM, ROM, SRAM, DRAM, RDRAM, EEPROM and other types of volatile or non-volatile memory capable of storing data. The processor unit 2420 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 2440 may include a system bus, LDT, PCI, ISA, or other types of buses, and the communications or network interface may, for example, be an Ethernet interface, a Frame Relay interface, or other interface. The network interface 2430 may be configured to enable a system component to communicate with other system components across a network which may be a wireless or various other networks. It should be noted that one or more components of computing device 2400 may be located remotely and accessed via a network. Accordingly, the system configuration provided in FIG. 24 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 2420 performs steps or executes program instructions 2412 within memory 2410 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while certain embodiments are describe described with reference to processing video (frames thereof) and voice data based on the user speaking during recording of the video, embodiments may also involve the user taking photographs of the tax documents, independently recording verbal descriptions of the tax documents, synchronizing, matching or associating the photographs with respective voice descriptions, and processing the images and voice data. Thus, recording of tax documents, via video or photograph, may be done simultaneously with a user speaking and providing verbal descriptions or explanations, or the tax document video or image capture may be performed independently of the user's verbal description.

While multiple embodiments and variations of the many aspects of the invention have been disclosed and described herein, such disclosure is provided for purposes of illustration only. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially.

Accordingly, embodiments are intended to exemplify alternatives, modifications, and equivalents that may fall within the scope of the claims.

What is claimed is:

1. A computer-implemented method for populating an electronic tax return, the computer-implemented method being executed by a mobile communication device comprising a data store comprising a tax return preparation application operable to prepare an electronic tax return, a first camera that is a front facing camera, a second camera that is a rear facing camera, a microphone and a video/voice processor, each of the data store, the first camera, the second camera and the microphone being in communication with the video/voice processor, the method comprising:

the mobile communication device, by the first camera, recording a video of a tax document, the recorded video comprising a plurality of video frames and voice data generated based on a user of the mobile communication device speaking into the microphone during recording of the video, the voice data comprising a user-spoken description of how the tax document is relevant to the electronic tax return;

converting, by the video/voice processor of the mobile communication device, the voice data from a voice format into a text format;

analyzing, by the video/voice processor, at least one video frame of the video and the voice data in the text format to determine a document type and tax data contained within the at least one video frame;

identifying, by the tax return preparation application executed by a processor of the mobile communication device, a field of the electronic tax return to be populated with determined tax data of the determined document type;

populating, by the tax return preparation application, the field of the electronic tax return with the determined tax data to prepare at least a portion of the electronic tax return without the user typing tax data of the tax document that was captured in the video into the field of the electronic tax return;

detecting, by the second camera, a facial expression or gesture of the user during preparation of the electronic tax return;

determining, by the video/voice processor, a first response based at least in part on the detected facial expression or gesture; and presenting, by the tax return preparation application, the first response to the user during preparation of the electronic tax return.

2. The computer-implemented method of claim 1, at least one video frame comprising a static image of the tax document, the static image being analyzed by the video/voice processor to determine the document type.

3. The computer-implemented method of claim 2, the document type being determined based at least in part upon analysis of the static image by the video/voice processor:

determining a structure of the tax document within the static image;

comparing the determined structure and a plurality of templates; and selecting a template based at least in part upon the comparison, the document type being determined based at least in part upon the selected template.

4. The computer-implemented method of claim 2, wherein when the video/voice processor is unable to determine the document type based on analysis of the static image, the method further comprising the video/voice processor analyzing the voice data in the text format to determine the document type.

5. The computer-implemented method of claim 4, analyzing the voice data in the text format comprising the video/voice processor:

parsing the voice data into voice segments;

comparing voice segments and pre-determined voice segments; and determining the document type corresponding to the matched pre-determined segment based at least in part upon a voice segment matching a pre-determined voice segment.

6. The computer-implemented method of claim 2, wherein the video/voice processor determines the document type based on analysis of the static image, further comprising the video/voice processor confirming the determined document type based at least in part upon analyzing the voice data.

7. The computer-implemented method of claim 2, wherein the video/voice processor is unable to determine the document type based on analysis of the static image and the voice data, the method further comprising the video/voice processor requesting input by the user to identify the document type.

8. The computer-implemented method of claim 1, at least one video frame comprising a static image of the tax document, wherein at least the static image is analyzed by the video/voice processor to determine the document type and the tax data.

9. The computer-implemented method of claim 8, the document type being determined by the video/voice processor utilizing a first recognition process, and the tax data being determined by the video/voice processor utilizing a second recognition process different than the first recognition process.

10. The computer-implemented method of claim 9, the first recognition process involving a comparison of a document structure determined from at least one video frame, and the second recognition process involving character recognition of data within the at least one video frame.

11. The computer-implemented method of claim 1, at least one video frame comprising a static image of the tax document, wherein the static image and the voice data are both analyzed by the video/voice processor to determine the document type.

12. The computer-implemented method of claim 11, determining the document type based at least in part upon analysis of the static image and the voice data comprising the video/voice processor:

determining a structure of the tax document within the static image;

comparing the determined structure and a plurality of tax document templates;

selecting a template based at least in part upon the comparison;

parsing the voice data into voice segments; and comparing voice segments and pre-determined voice segments, wherein the document type is determined based at least in part upon the selected template and a determination that the voice segment matches the pre-determined voice segment.

13. The computer-implemented method of claim 1, wherein the document type is determined based on a first type of video analysis, and the tax data is determined based on a second type of video analysis.

14. The computer-implemented method of claim 1, further comprising the video/voice processor synchronizing or associating the plurality of video frames and the voice data.

15. The computer-implemented method of claim 14, the plurality of video frames and the voice data being synchronized by the video/voice processor based at least in part upon respective elapsed times from a first video frame and a beginning of the voice data.

16. The computer-implemented method of claim 1, wherein the video is recorded when the tax document and the mobile communication device are positioned relative to each other such that the tax document is in view of the first camera of the mobile communication device, the video of the tax document being recorded by the first camera while the user provides voice data by speaking into the microphone of the mobile communication device.

17. The computer-implemented method of claim 1, the voice data comprising a user-spoken description of the tax document.

18. The computer-implemented method of claim 1, the voice data comprising a user-spoken description of a source of the tax document.

19. The computer-implemented method of claim 1, further comprising engaging, by the video/voice processor, in an electronic dialogue with the user in response to at least one of the determined document type and determined tax data.

20. The computer-implemented method of claim 19, engaging in the electronic dialogue comprising the video/voice processor:
determining a second response based at least in part upon at least one of the determined document type and determined tax data; and
presenting the second response to the user through the mobile communication device.

21. The computer-implemented method of claim 20, the electronic dialogue being executed by the video/voice processor utilizing text-to-speech and voice recognition.

22. The computer-implemented method of claim 20, the second response being a question, an instruction, an explanation related to the electronic tax return, or identification of a section of the electronic tax return.

23. The computer-implemented method of claim 22, the second response comprising multiple questions, instructions, explanations or identification of multiple sections of the electronic tax return.

24. The computer-implemented method of claim 20, the second response being determined by the video/voice processor with reference to a tree structure or table identifying which response should be presented to the user based on at least one of respective determined document types and respective determined tax data.

25. The computer-implemented method of claim 1, the first response being determined with reference to a tree structure or table identifying which response should be presented to the user based at least in part upon the detected facial expression or gesture.

26. The computer-implemented method of claim 20, the mobile communication device further comprising a biometric sensor that is in communication with the video/voice processor, further comprising:
receiving, by the video/voice processor, data of the biometric sensor of the mobile communication device;
determining, by the video/voice processor, a third response based at least in part upon the biometric data satisfying pre-determined criteria; and
presenting, by the tax return preparation application, the determined third response to the user.

27. The computer-implemented method of claim 26, the biometric sensor data indicating a pulse rate of the user of the mobile communication device, wherein the pulse rate is detected while the user is holding the mobile communication device and engaged in the electronic dialogue.

28. The computer-implemented method of claim 1, wherein the electronic tax return is not completed based solely on tax data determined from the video processed by the video/voice processor, further comprising the tax return preparation application:
identifying fields of the electronic tax return that were not populated with determined tax data; and
presenting the identified fields to the user through the mobile communication device.

29. The computer-implemented method of claim 1, wherein the electronic tax return is completed by the tax return preparation application based solely on tax data determined from the video processed by the video/voice processor.

30. The computer-implemented method of claim 1, further comprising the mobile communication device, by the tax return preparation application, transmitting a completed electronic tax return through a network to a computer of a tax authority to electronically file the completed electronic tax return with the tax authority.

31. The computer-implemented method of claim 1, the video/voice processor analyzing the voice data comprising the video/voice processor:
parsing the voice data in the text format into a plurality of segments;
comparing the plurality of segments and pre-determined voice segments; and
selecting segments of the plurality of segments that match pre-determined voice segments.

32. The computer-implemented method of claim 31, further comprising the video/voice processor filtering the plurality of segments such that segments that remain after filtering are compared with the pre-determined voice segments.

33. The computer-implemented method of claim 31, further comprising the video/voice processor accessing a data structure and determining a corresponding document identification associated with a selected segment.

34. The computer-implemented method of claim 1, the facial expression or gesture involving a change of the user's eyes, lips, mouth or forehead detected utilizing the second camera of the mobile communication device.

35. The computer-implemented method of claim 1, the video/voice processor detecting a change of a facial expression or gesture from a first facial expression or gesture detected utilizing the second camera to a second facial expression or gesture different than the first facial expression or gesture detected utilizing the second camera, further comprising:
determining, by the video/voice processor, a second response based at least in part upon the detected change of the facial expression or gesture, and
presenting, by the tax return preparation application, the second response to the user during preparation of the electronic tax return.

36. The computer-implemented method of claim 1, further comprising the video/voice processor:
performing a comparison of a detected facial expression and pre-determined facial expression templates; and
selecting a template based at least in part upon the comparison, wherein the second response is determined based at least in part upon the selected template and presented to the user through the mobile communication device during preparation of the electronic tax return.

37. The computer-implemented method of claim 26, the pre-determined criteria comprising a detected pulse rate of the user exceeding a pre-determined pulse rate threshold.

38. The computer-implemented method of claim 26, wherein the biometric sensor is a sensor integrated within clothing of the user and in communication with the mobile communication device, further comprising the video/voice processor receiving the biometric sensor data through a wireless connection with the biometric sensor integrated within clothing of the user, wherein the third response is based at least in part upon the biometric data received from the sensor integrated within the user's clothing and presented to the user through the mobile communication device.

39. The computer-implemented method of claim 14, the plurality of video frames and the voice data being synchronized based at least in part upon a detected trigger or keyword of the voice data indicating a transition of recording a first tax document to recording a different, second tax document.

40. The computer-implemented method of claim 14, wherein synchronization is based at least in part upon input to the mobile communication device comprising the user tapping a screen of the mobile communication device to indicate a transition of recording a first tax document to recording a different, second tax document.

41. The computer-implemented method of claim 1, wherein the facial expression or gesture is detected during an electronic dialogue with the user during preparation of the electronic tax return.

42. The computer-implemented method of claim 1, the mobile communication device further comprising a biometric sensor that is in communication with the video/voice processor, further comprising:

receiving, by the video/voice processor, data of a biometric sensor of the mobile communication device;

determining, by the video/voice processor, a second response based at least in part upon the biometric data satisfying pre-determined criteria; and presenting, by the tax return preparation application, the determined second response to the user.

43. The computer-implemented method of claim 1, wherein multiple fields of the electronic tax return are identified to be populated with respective determined tax data of the determined document type, the method further comprising:

populating, by the tax return preparation application, respective fields of the electronic tax return with respective determined tax data to prepare respective portions of the electronic tax return without the user typing respective tax data of the tax document that was captured in the video into respective fields of the electronic tax return.

* * * * *